(12) United States Patent
Zevenbergen et al.

(10) Patent No.: US 10,974,911 B2
(45) Date of Patent: Apr. 13, 2021

(54) REPLENISHMENT STATION FOR AERIAL VEHICLE WITH ROBOTIC DEVICE AND CONVEYOR

(71) Applicant: Wing Aviation LLC, Mountain View, CA (US)

(72) Inventors: John Zevenbergen, Saratoga, CA (US); Robert Holmberg, Mountain View, CA (US)

(73) Assignee: Wing Aviation LLC, Mountain View, CA (US)

( * ) Notice: Subject to any disclaimer, the term of this patent is extended or adjusted under 35 U.S.C. 154(b) by 511 days.

(21) Appl. No.: 15/852,934

(22) Filed: Dec. 22, 2017

(65) Prior Publication Data

US 2019/0193952 A1   Jun. 27, 2019

(51) Int. Cl.
| | |
|---|---|
| *B65G 47/91* | (2006.01) |
| *B64F 1/22* | (2006.01) |
| *B65G 47/04* | (2006.01) |
| *B65G 47/92* | (2006.01) |
| *B60L 53/12* | (2019.01) |

(Continued)

(52) U.S. Cl.
CPC .............. *B65G 47/91* (2013.01); *B60L 53/12* (2019.02); *B64F 1/22* (2013.01); *B65G 47/04* (2013.01); *B65G 47/92* (2013.01); *B60L 2200/10* (2013.01); *B64C 39/024* (2013.01); *B64C 2201/128* (2013.01); *B65G 47/905* (2013.01)

(58) Field of Classification Search
None
See application file for complete search history.

(56) References Cited

U.S. PATENT DOCUMENTS

| 2,635,834 A | 4/1953 | Huch |
| 4,416,433 A | 11/1983 | Bellina |
| 5,108,337 A | 4/1992 | Sloan et al. |

(Continued)

FOREIGN PATENT DOCUMENTS

WO   2013/055265   4/2013

OTHER PUBLICATIONS

International Searching Authority, International Search Report and Written Opinion dated Apr. 23, 2019, issued in connection with International Patent Application No. PCT/US2018/066535, filed on Dec. 19, 2018, 10 pages.

(Continued)

*Primary Examiner* — Brian M O'Hara
*Assistant Examiner* — Keith L Dixon
(74) *Attorney, Agent, or Firm* — McDonnell Boehnen Hulbert & Berghoff LLP

(57) ABSTRACT

Stations for deployment, recharging and/or maintenance of a plurality of unmanned aerial vehicles (UAVs) are disclosed herein. Such deployment stations can be implemented in a container that includes a robotic arm and a conveyor system. The robotic arm can secure a UAV hovering outside the station, move the UAV inside the station, and transfer the UAV to the conveyor. The conveyor can couple to and move multiple UAVs. Further, charging systems may be integrated in such deployment stations to charge UAVs when coupled to and moving along the conveyor. Further, process pieces may be utilized to simplify mechanical and electrical interfacing between a UAV, the robotic arm, the conveyor, the charging system and/or other systems at the UAV station.

20 Claims, 12 Drawing Sheets

(51) Int. Cl.
  *B64C 39/02* (2006.01)
  *B65G 47/90* (2006.01)

(56) References Cited

U.S. PATENT DOCUMENTS

| | | | |
|---|---|---|---|
| 5,636,480 | A | 6/1997 | Lauritsen et al. |
| 7,356,390 | B2 | 4/2008 | Knoblach et al. |
| 8,061,648 | B2 | 11/2011 | Lachenmeier |
| 9,284,062 | B2 | 3/2016 | Wang |
| 9,387,928 | B1 | 7/2016 | Gentry et al. |
| 9,421,869 | B1 * | 8/2016 | Ananthanarayanan ............ B60L 53/38 |
| 9,434,267 | B2 | 9/2016 | Wang et al. |
| 9,778,653 | B1 * | 10/2017 | McClintock ......... B67D 7/0401 |
| 2002/0072361 | A1 | 6/2002 | Knoblach et al. |
| 2004/0059476 | A1 | 3/2004 | Nichols |
| 2006/0137348 | A1 | 6/2006 | Pas |
| 2006/0249623 | A1 | 11/2006 | Steele |
| 2010/0060093 | A1 | 3/2010 | Hunter |
| 2013/0007935 | A1 | 1/2013 | Chin et al. |
| 2013/0081245 | A1 * | 4/2013 | Vavrina ................. B60L 53/51 29/402.08 |
| 2015/0183326 | A1 | 7/2015 | Ryberg et al. |
| 2016/0209839 | A1 | 7/2016 | Hoareau et al. |
| 2017/0008409 | A1 * | 1/2017 | Roberts ................. B60L 53/38 |
| 2017/0096222 | A1 * | 4/2017 | Spinelli ................. B64C 27/08 |
| 2017/0334581 | A1 * | 11/2017 | White ................. H01M 2/1083 |
| 2018/0188747 | A1 * | 7/2018 | Venturelli ............. B64C 39/024 |

OTHER PUBLICATIONS

Hebert et al., Statutory Invention Registration, Floating Platform for Remote Basing, US H2254 H, Jun. 7, 2011.

* cited by examiner

REPLENISHMENT STATION FOR AERIAL VEHICLE WITH ROBOTIC DEVICE AND CONVEYOR

BACKGROUND

An unmanned system, which may also be referred to as an autonomous vehicle, is a vehicle capable of travel without a physically-present human operator. An unmanned system may operate in a remote-control mode, in an autonomous mode, or in a partially autonomous mode.

When an unmanned system operates in a remote-control mode, a pilot or driver that is at a remote location can control the unmanned vehicle via commands that are sent to the unmanned vehicle by way of a wireless link. When the unmanned system operates in autonomous mode, the unmanned system typically moves based on pre-programmed navigation waypoints, dynamic automation systems, or a combination of these. Further, some unmanned systems can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned systems exist for various different environments. For instance, unmanned aerial vehicles (UAVs) are configured for operation in the air (e.g., flight). Examples include quad-copters and tail-sitter UAVs, among others. Unmanned systems also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

Disclosed herein are unmanned aerial vehicle (UAV) stations and systems, which can serve as a "base" or "nest" for multiple UAVs. UAVs can return to these stations to recharge their batteries between flights, undergo maintenance and servicing, and so on. An example UAV station may be implemented in a container (e.g., a 40-foot or 80-foot shipping container), semi-trailer truck, train car, or other mobile or semi-mobile unit, having a robot arm therein. The robotic arm can reach through an opening in the roof of the container to couple to a UAV that is hovering above the container. Additionally, fiducials may be placed on the underside of UAVs and recognized with a camera at the station, to assist the process of securing a UAV with the robotic arm. Once a UAV is secured, the UAV may power down, such that the robotic arm can move the UAV inside the container and place the UAV on a conveyor.

Advantageously, the container can include a battery charging system configured to charge UAVs while they move along the conveyer (e.g., using inductive charging or a series of slip-ring connections). After a given UAV has been recharged to a desired battery level, the robotic arm can remove the UAV from the conveyer and position the UAV so that a payload can be loaded on the UAV for transport and/or so that the UAV is positioned to take off and depart the shipping container via an opening in the roof of the container (which may be the same as or different from the opening through which the UAV was brought inside the container).

In one aspect, an example system includes: (a) a container configured to house a plurality of aerial vehicles; (b) a conveyor operable to couple to and move aerial vehicles from a receiving location to a removal location; (c) a robotic device having a moveable component operable to couple to a first aerial vehicle hovering outside the container, to move the secured first aerial vehicle inside of the container, and to transfer the first aerial vehicle to the conveyor at the receiving location; (d) a control system operable to control at least the robotic device; and (e) a battery charging system operable to concurrently charge two or more aerial vehicles coupled to the conveyer, while the two or more aerial vehicles are coupled to and moving along the conveyor.

In a further aspect, another example system includes: (a) a container configured to house a plurality of aerial vehicles; (b) a conveyor operable to couple to and move aerial vehicles from a receiving location to a removal location; (c) a robotic device having a moveable component operable to couple to a first aerial vehicle hovering outside the container, to move the secured first aerial vehicle inside of the container, and to transfer the first aerial vehicle to the conveyor at the receiving location; (d) a control system operable to control at least the robotic device; and (e) a plurality of process plates, wherein each process plate is configured to couple to an aerial vehicle to the conveyor, such that two or more aerial vehicle are concurrently couplable to the conveyor.

These as well as other aspects, advantages, and alternatives, will become apparent to those of ordinary skill in the art by reading the following detailed description, with reference where appropriate to the accompanying drawings.

DETAILED DESCRIPTION

Figure 1A:
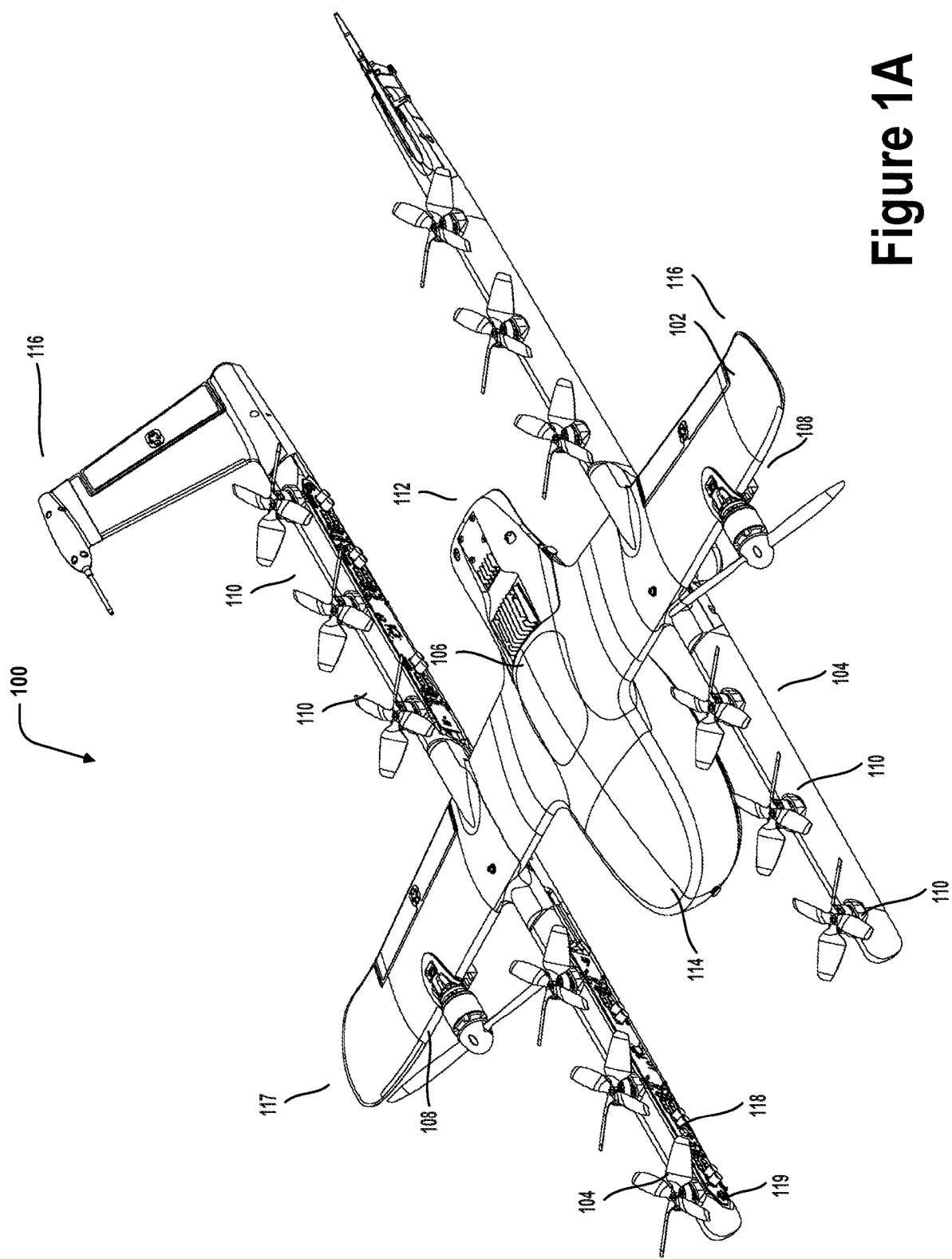
FIG. 1A is a simplified illustration of an unmanned aerial vehicle, according to example embodiments.

Example methods and systems are described herein. It should be understood that the words "example" and "example" are used herein to mean "serving as an example, instance, or illustration." Any embodiment or feature described herein as being an "example" or "example" is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. OVERVIEW

An aerial transport service provider (ATSP) may operate a fleet of UAVs to provide aerial transport service. In some cases, the ATSP may be a separate entity from the entity or entities that provide the items being transported and/or interface with the recipients who request delivery of these items. For example, a company that operates a fleet of UAVs configured for item delivery may provide delivery services for third-party entities (referred to herein as "item providers"), such as restaurants, clothing stores, grocery stores, and other "brick and mortar" and/or online retailers, among other possibilities. These third-party entities may have accounts with the UAV transport service provider, through which the third-parties can request and/or purchase UAV transport services from the transport service provider. Further, the third-party entities could interface with recipients (e.g., customers) directly, or through computing systems (e.g., applications and/or server systems) provided by the UAV transport service provider.

In such arrangements, an ATSP may distribute stations for deploying or dispatching UAVs to perform transport tasks, at various locations throughout a geographic area, such that a larger area can be served and/or so as to improve timeliness and efficiency of its service. Disclosed herein are UAV deployment stations or "nests" that can facilitate replenishment of UAVs (e.g., charging, maintenance, service, firmware upgrades, replacement of UAVs no longer in condition for service, etc.) that provide such UAV transport services (and perhaps in other types of UAV systems as well).

In one aspect, example deployment stations can be implemented in self-contained mobile containers (e.g., shipping containers), such that an ATSP can dynamically change the topology of their UAV deployment stations according to changing demand for UAV transport service in different areas. Such UAV deployment stations may, in some cases, include their own power generation systems (e.g., solar panels or wind power generation systems) to facilitate deployment in many different locations.

Further, an example UAV deployment station is implemented in a container that includes a robotic arm and a conveyor system. The robotic arm can secure a UAV hovering outside the station, move the UAV inside the station, and transfer the UAV to a conveyor. The conveyor can couple to and move multiple UAVs through the container, from a point where UAVs are transferred from the robotic arm to the conveyor, to a location where UAVs are transferred to a loading and/or take-off zone in the container.

Further, charging systems may be integrated in such deployment stations to charge UAVs when coupled to and moving along the conveyer. In some embodiments, wireless charging may be implemented, with wireless transmitters being positioned adjacent to the conveyer, so as to wirelessly charge UAVs as they move along the conveyer.

Further, in some embodiments, process pieces may be utilized to simplify mechanical and electrical interfacing between a UAV, the robotic arm, the conveyor, the charging system and/or other systems at the UAV station. For example, a process plate may be used by a robotic arm to secure a hovering UAV (e.g., by an electromagnet coupling between the process plate and UAV). The process plate and UAV may then be moved to the conveyor, where the process plate can be coupled to the conveyor, such that the UAV is suspended from the conveyor through the process plate. The robotic arm can then release the process plate, such that the conveyor can begin moving the UAV.

Further, in some implementations, the process plate can include certain components and/or interfaces that might normally be integrated in a UAV, which in turn can reduce the UAV's weight, simplify the UAV's systems, and/or increase the UAV's maximum flight time on a full charge. For example, a wireless charging receiver and/or DC converter may be integrated in the process plate, which can couple to the UAV by electrical contacts on the process plate and UAV. The process plate may thus provide the electrical systems for charging the UAV's battery, such that a UAV might be designed without such systems. Other examples are of course possible.

Further, in some embodiments, the robotic arm could additionally or alternatively be configured to reach through an opening in the container to retrieve a UAV that has landed on the ground next to container (perhaps through a side opening in the container), or on top of the container itself.

II. ILLUSTRATIVE UNMANNED VEHICLES

Herein, the terms "unmanned aerial system" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial vehicle" (UAV) may also be used to refer to a UAV FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1A illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
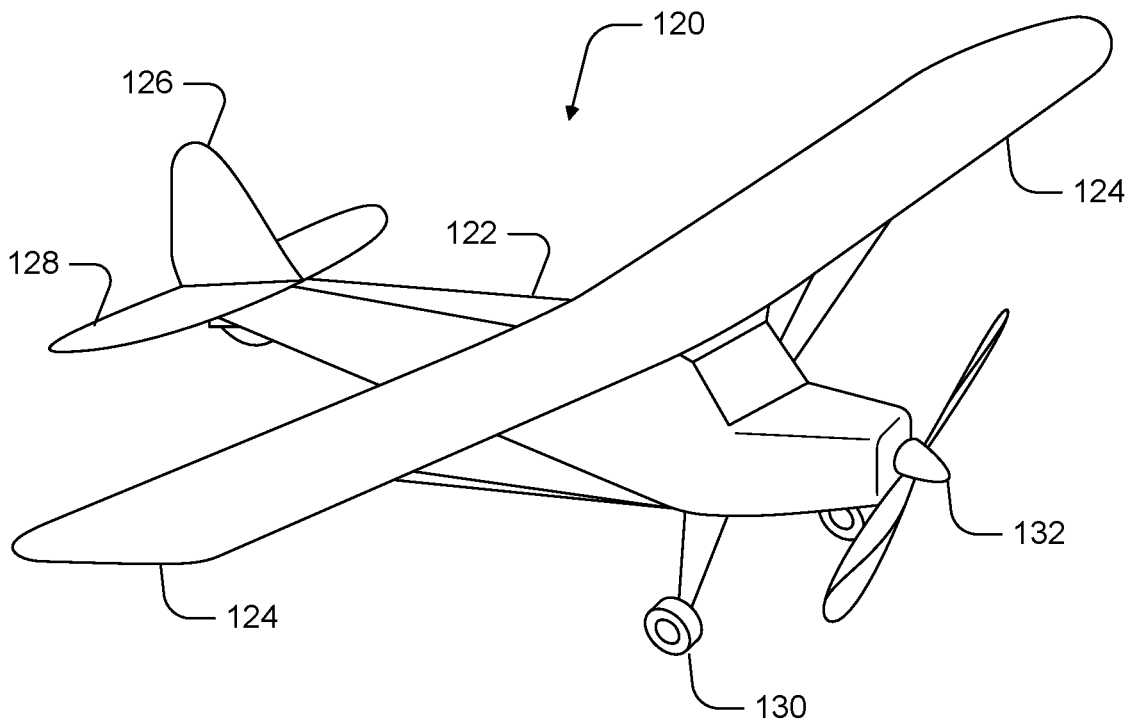
FIG. 1B is a simplified illustration of an unmanned aerial vehicle, according to example embodiments.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
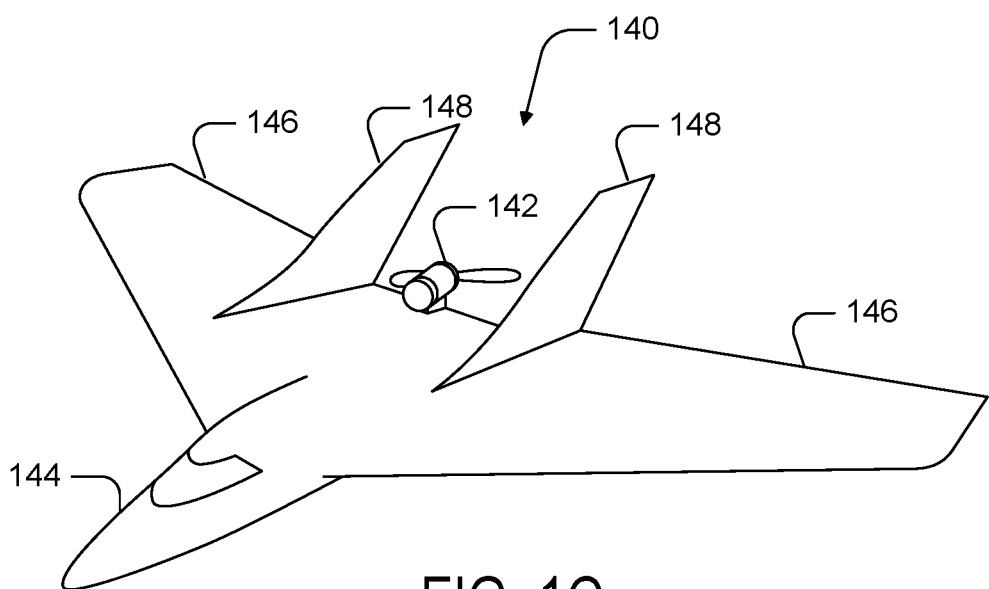
FIG. 1C is a simplified illustration of an unmanned aerial vehicle, according to example embodiments.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
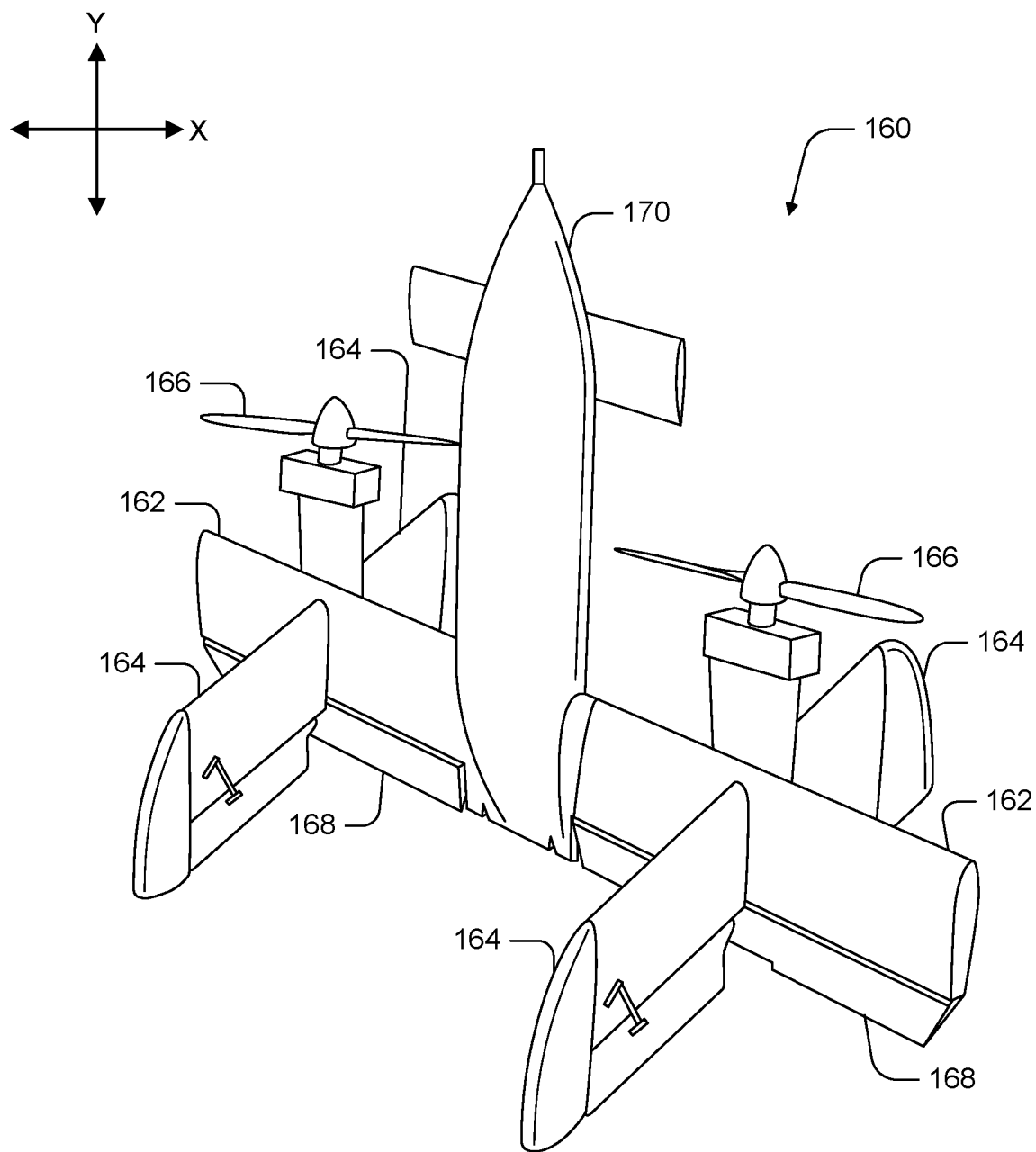
FIG. 1D is a simplified illustration of an unmanned aerial vehicle, according to example embodiments.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
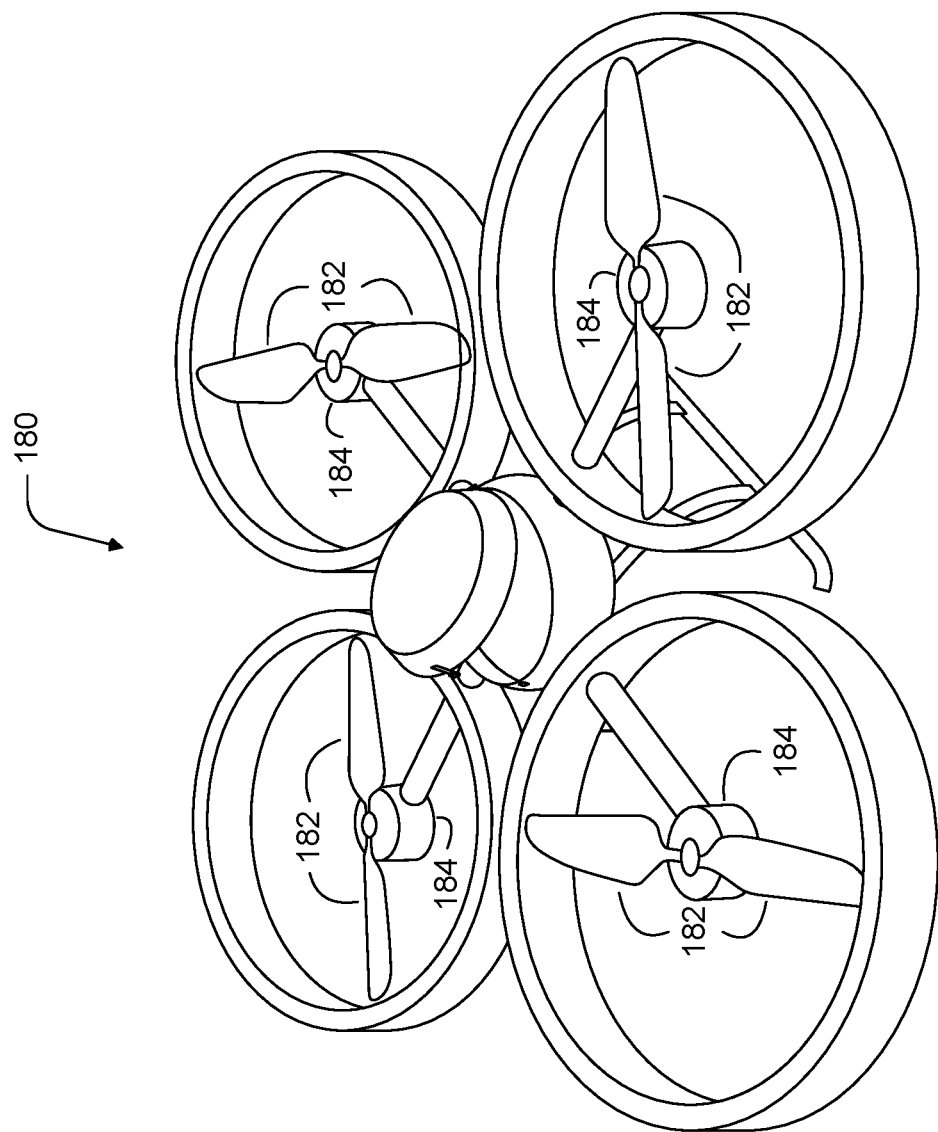
FIG. 1E is a simplified illustration of an unmanned aerial vehicle, according to example embodiments.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled by real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. ILLUSTRATIVE UAV COMPONENTS

Figure 2:
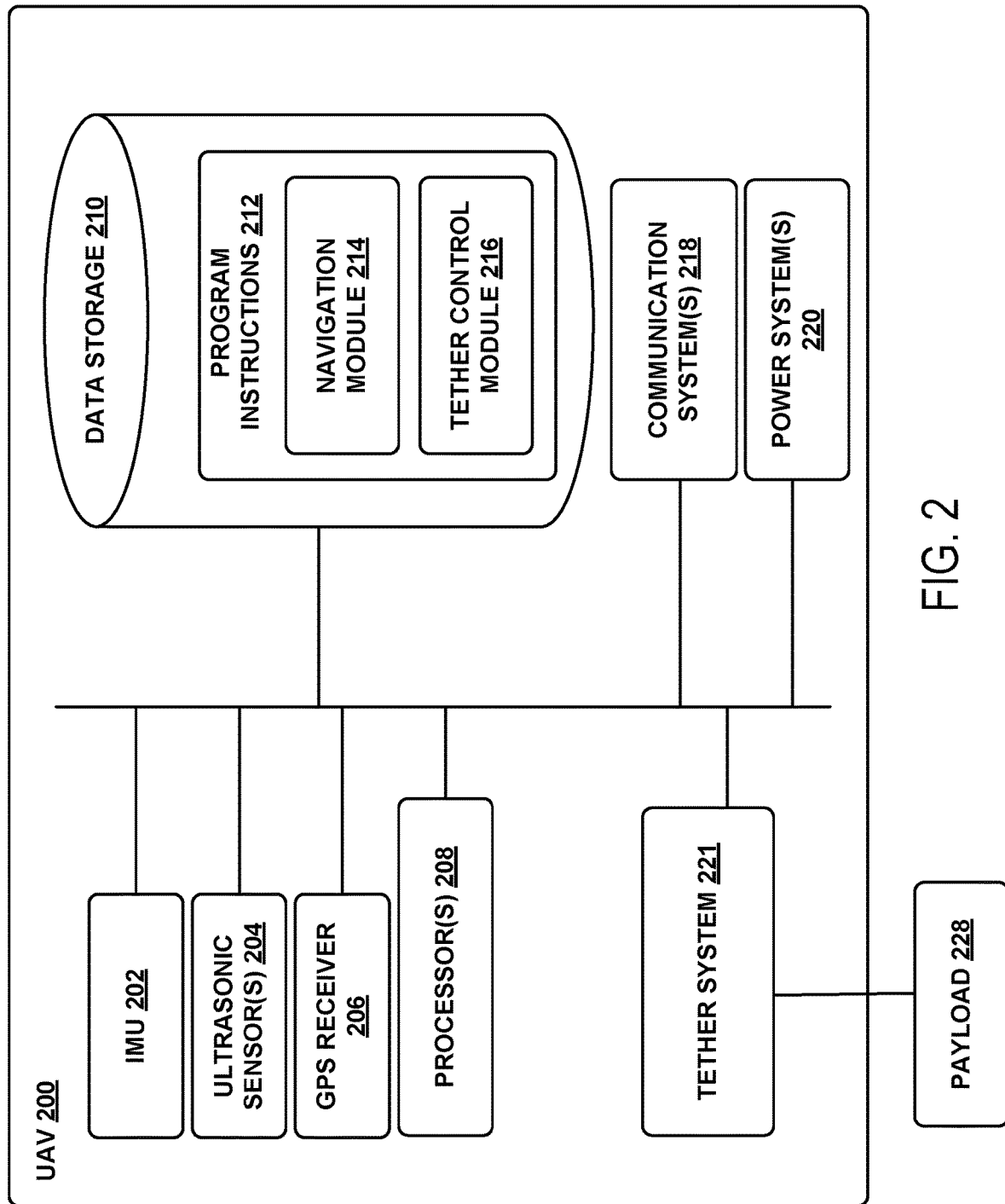
FIG. 2 is a simplified block diagram illustrating components of an unmanned aerial system, according to example embodiments.

FIG. 2 is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., by way of an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine altitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate by way of one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate by way of a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged by a wired connection between the battery and a power supply and/or by a wireless charging system, such as an inductive charging system that applies an external time-varying magnetic field to an internal battery.

E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may one or more food items, purchased goods, medical items, or any other object(s) having a size and weight suitable to be transported between two locations by the UAV. In other embodiments, a payload 228 may simply be the one or more items that are being delivered (e.g., without any package housing the items).

In some embodiments, the payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when the payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include a tether system 221, which may be controlled by the tether control module 216 in order to lower the payload 228 to the ground while the UAV hovers above. The tether system 221 may include a tether, which is couplable to a payload 228 (e.g., a package). The tether 224 may be wound on a spool that is coupled to a motor 222 of the UAV (although passive implementations, without a motor, are also possible). The motor may be a DC motor (e.g., a servo motor) that can be actively controlled by a speed controller, although other motor configurations are possible. In some embodiments, the tether control module 216 can control the speed controller to cause the 222 to rotate the spool, thereby unwinding or retracting the tether and lowering or raising the payload coupling apparatus. In practice, a speed controller may output a desired operating rate (e.g., a desired RPM) for the spool, which may correspond to the speed at which the tether system should lower the payload towards the ground.

The motor may then rotate the spool so that it maintains the desired operating rate (or within some allowable range of operating rates).

In order to control the motor by a speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

In some embodiments, a payload coupling component (e.g., a hook or another type of coupling component) can be configured to secure the payload 228 while being lowered from the UAV by the tether. The coupling apparatus or component and can be further configured to release the payload 228 upon reaching ground level by electrical or electro-mechanical features of the coupling component. The payload coupling component can then be retracted to the UAV by reeling in the tether using the motor.

In some implementations, the payload 228 may be passively released once it is lowered to the ground. For example, a payload coupling component may provide a passive release mechanism, such as one or more swing arms adapted to retract into and extend from a housing. An extended swing arm may form a hook on which the payload 228 may be attached. Upon lowering the release mechanism and the payload 228 to the ground by a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

In another implementation, a payload coupling component may include a hook feature that passively releases the payload when the payload contacts the ground. For example, the payload coupling component may take the form of or include a hook feature that is sized and shaped to interact with a corresponding attachment feature (e.g., a handle or hole) on a payload taking the form of a container or tote. The hook may be inserted into the handle or hole of the payload container, such that the weight of the payload keeps the payload container secured to the hook feature during flight. However, the hook feature and payload container may be designed such that when the container contacts the ground and is supported from below, the hook feature slides out of the container's attachment feature, thereby passively releasing the payload container. Other passive release configurations are also possible.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

IV. ILLUSTRATIVE UAV DEPLOYMENT SYSTEMS

Figure 3:
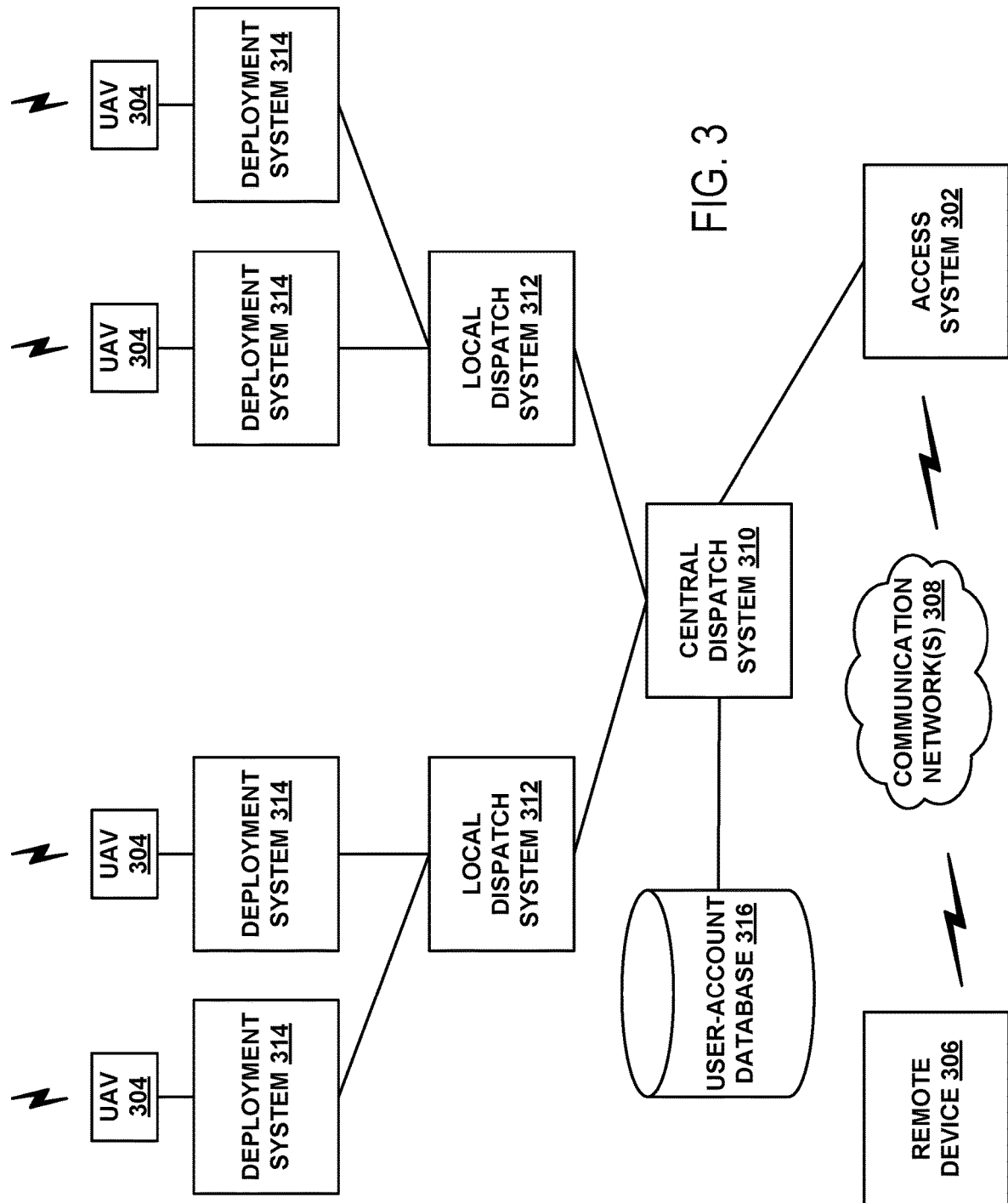
FIG. 3 is a simplified block diagram illustrating a distributed UAV system, according to example embodiments.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished by one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV by way of its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIG. 1, 2, 3, or 4. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication by way of plain old telephone service (POTS), may serve as the remote device 306. Other types of remote devices are also possible.

Further, the remote device 306 may be configured to communicate with access system 302 by way of one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request pick-up of one or more items from a certain source location and/or delivery of one or more items to a desired location. For example, a user could request UAV delivery of a package to their home by way of their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In some embodiments, a business user (e.g., a restaurant) could utilize one or more remote devices 306 to request that a UAV be dispatched to pick-up one or more items (e.g., a food order) from a source location (e.g., the restaurant's address), and then deliver the one or more items to a target location (e.g., a customer's address). Further, in such embodiments, there may be a number of remote devices 306 associated with a common item-provider account (e.g., an account used by multiple employees and/or owners of a particular restaurant). Additionally, in such embodiments, a remote device 306 may be utilized to send item-provider submissions to a transport-provider computing system (e.g., central dispatch system 310 and or local dispatch system 312), which each indicate a respective quantitative measure for a given amount of UAV transport service at a given future time. For example, remote device 306 may be utilized to generate and send an item-provider submission that specifies a level of desired UAV transport services (e.g., number and/or rate of expected UAV delivery flights), and/or a monetary value corresponding to the item provider's need for UAV transport services, at a particular time or during a particular period of time in the future.

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 by way of a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system (e.g., having more layers of control), and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In some implementations, some or all of the deployment systems 314 may be a structure or system that passively facilitates a UAV taking off from a resting position to begin a flight. For example, some or all of the deployment systems 314 may take the form of a landing pad, a hangar, and/or a runway, among other possibilities. As such, a given deployment system 314 may be arranged to facilitate deployment of one UAV 304 at a time, or deployment of multiple UAVs (e.g., a landing pad large enough to be utilized by multiple UAVs concurrently).

Additionally or alternatively, some or all of deployment systems 314 may take the form of or include systems for actively launching one or more of the UAVs 304. Such launch systems may include features that provide for an automated UAV launch and/or features that allow for a human-assisted UAV launch. Further, a given deployment system 314 may be configured to launch one particular UAV 304, or to launch multiple UAVs 304.

Note that deployment systems 314 may also be configured to passively facilitate and/or actively assist a UAV when landing. For example, the same landing pad could be used for take-off and landing. Additionally or alternatively, a deployment system could include a robotic arm operable to receive an incoming UAV. A deployment system 314 could also include other structures and/or systems to assist and/or facilitate UAV landing processes. Further, structures and/or systems to assist and/or facilitate UAV landing processes may be implemented as separate structures and/or systems, so long as UAVs can move or be moved from a landing structure or system to a deployment system 314 for re-deployment.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, local dispatch systems 312 (along with their respective deployment system(s) 314 may be strategically distributed throughout an area such as a city. For example, local dispatch systems 312 may be strategically distributed such that each local dispatch systems 312 is proximate to one or more payload pickup locations (e.g., near a restaurant, store, or warehouse). However, the local dispatch systems 312 may be distributed in other ways, depending upon the particular implementation.

As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more person. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a user name and password), and/or other information that may be used to authorize access to a user account.

In some embodiments, a person may associate one or more of their devices with their user account, such that they can access the services of UAV system 300. For example, when a person uses an associated mobile phone to, e.g., place a call to an operator of the access system 302 or send a message requesting a UAV-related service to a dispatch system, the phone may be identified by way of a unique device identification number, and the call or message may then be attributed to the associated user account. Other examples are also possible.

Additionally or alternatively, an item provider that wishes to deliver their products using UAV transport services provided by a ATSP to deliver, can register for an item-provider account with the UAV system 300. As such, the user-account database 316 may include authorization information for a given item-provider account (e.g., one or more user name and password combinations), and/or other information that may be used to authorize access to a given item-provider account. Alternatively, data for item-provider accounts may be kept in a separate database from recipient user accounts. Other data structures and storage configurations for storing such account data are also possible.

V. UAV TRANSPORT SERVICES WITH SEPARATELY LOCATED ITEM PROVIDERS AND UAV HUBS

As noted above, a UAV transport service provider may be a separate entity from the entity or entities that provide the items being transported and/or interface with the recipients who request delivery of these items. For example, a company that operates a fleet of UAVs configured for item delivery may provide delivery services for third-party entities, such as restaurants, clothing stores, grocery stores, and other "brick and mortar" and/or online retailers, among other possibilities. These third-party entities may have accounts with the UAV transport service provider, via which the third-parties can request and/or purchase UAV transport services from the transport service provider. Further, the third-party entities could interface with recipients (e.g., customers) directly, or through computing systems (e.g., applications and/or server systems) provided by the UAV transport service provider.

Figure 4A:
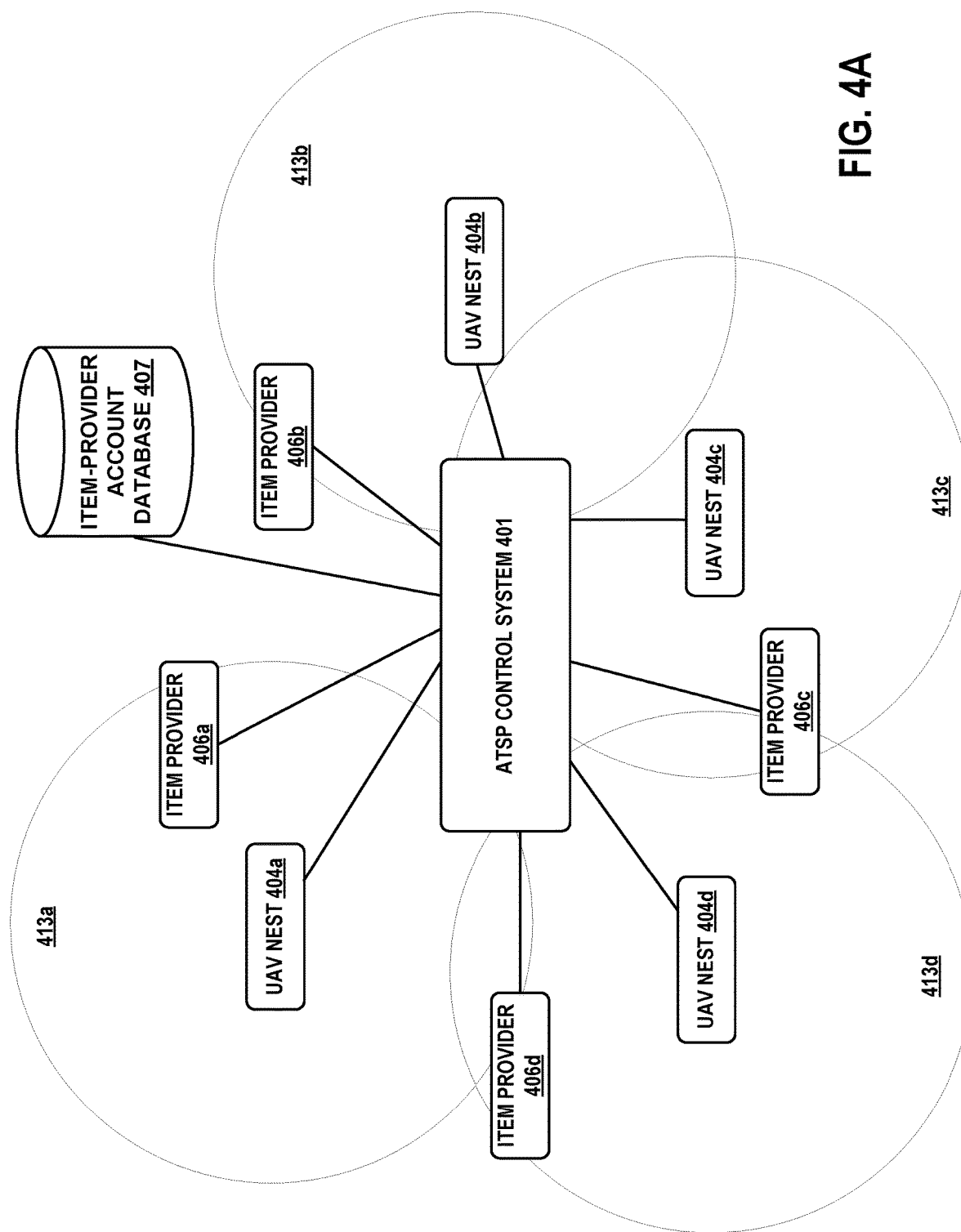
FIG. 4A is a block diagram showing an example arrangement for a transport provider system, according to example embodiments.

FIG. 4A is a block diagram showing an example arrangement for a transport provider system 402, which coordinates UAV transport services for a plurality of item providers that can be located remotely from the service provider's UAV deployment stations (e.g., UAV nests). As shown, an aerial transport service provider (ATSP) 402 may be communicatively coupled to UAV nests 404a to 404d, and communicatively coupled to item-provider computing systems 406a to 406d.

Each UAV nest 404a to 404d provides infrastructure where UAVs can be stored for at least a short period of time, and from which UAVs can begin carrying out a UAV transport task (e.g., where UAVs can take off). In some implementations, some or all of UAV nests 404a to 404d may take the form of a local dispatch system and one or more deployment systems, such as those described in reference to FIG. 3 above. Of course, some or all UAV nests 404a to 404d can take other forms and/or perform different functions.

Each item-provider computing system 406a to 406d may be associated with a different item-provider account. As such, a given item-provider computing system 406a to 406d may include one or more computing devices that are authorized to access the corresponding item-provider account with ATSP 402. (ATSP 402 may store data for item-provider accounts in an item-provider account database 407. In practice, a given item-provider computing system 406a to 406d may take the form of remote devices (e.g., such as one or more remote devices 306 described in reference to FIG. 3), which have all logged in to or otherwise been authorized to access the same item-provider account (e.g., cell phones, laptops, and/or computing devices of a business's employees). Additionally or alternatively, an item-provider computing system 406a to 406d may be implemented with less of an ad-hoc approach; e.g., with one or more user-interface terminals installed at the item provider's facilities. Other types of item-provider computing systems are also possible.

In order to provide UAV transport services to various item providers in an efficient and flexible manner, a UAV transport service provider 402 may dynamically assign different UAVs to transport tasks for different item providers 406a-406d, rather than permanently assigning each UAV to a particular item provider. As such, the particular UAV or UAVs that carry out transport tasks for a given third-party item provider may vary over time. The dynamic assignment of UAVs to flights for a number of different item providers can help a UAV transport service provider to more efficiently utilize a group of UAVs (e.g., by reducing unnecessary UAV downtime), as compared to an arrangement where specific UAVs are permanently assigned to specific item providers.

In a further aspect, each UAV nest 404a-404d is shown as having a corresponding service area 413a-413d, respectively. The service area of a given UAV nest may be defined, at least in part, by the flight range(s) of the UAVs that are located at or scheduled to be located at the UAV nest.

In some implementations, the service area 413a-413d for each UAV nest 404a-404d may be a fixed size, which does not vary over time. In other implementations, the size of a service area 413a-413d for a given UAV nest 404a-404d could vary over time based on various factors, such as demand for UAV transport services in the service area and/or nearby service areas, the number and/or capabilities of UAVs allocated to operate from the UAV nest, and/or the number and/or characteristics of item providers located near to the UAV nest, among other possibilities.

Additionally or alternatively, the size of a service area 413a-413d for a given UAV nest 404a-404d could vary on an order-by-order basis, and/or vary by item provider. More specifically, when a transport task involve three or more flight legs (e.g., a flight from the UAV nest to the item provider for pick-up, a flight from the item provider to a delivery location, and a return flight), there may be two or more flight legs before delivering an item. Thus, the evaluation of whether or not a given item provider is within the service area of a UAV nest for a given transport task depends on a combination of the distance from the UAV nest to the item pick-up location and the distance from the pick-up location to the delivery location. As a result, a given UAV nest may be able to serve a given item provider for one transport task, but not for another. In this context, it is possible that the notion of a defined "service area" may not be utilized at all. Instead, a service provider may simply evaluate whether a UAV transport task can be implemented on a task-by-task basis, given all of the parameters for completion of the task.

Since certain item providers can only be served by (or are better served by) a certain UAV nest or nests, and because demand for UAV transport services can vary between item providers, an ATSP control system 401 for a given area may implement an ongoing process to distribute and redistribute UAVs amongst the UAV nests 404a-404d that collectively serve the given area. In particular, the ATSP control system 401 may continually, periodically, or from time-to-time evaluate demand and/or other factors for each item provider 406a-406d, and determine a respective number of UAVs that are desirable at each UAV nest 404a-404d, in order to meet the demand for UAV transport services in the respective area that is served each UAV nest 404a-404d. Additionally or alternatively, the ATSP control system 401 could determine a respective number of UAVs that are desirable at each UAV nest 404a-404d such that UAV nests 404a-404d can collectively meet demand for UAV transport services in the larger area collectively served by the UAV nests 404a-404d.

In a further aspect, some ATSPs may provide for a system that further includes pre-staging locations and/or pre-staging infrastructure at locations that are closer to certain item providers than the closest UAV nest. In such arrangements, UAV nests may still serve as a "home" for UAVs, where UAVs can be serviced, re-charged, and so on. However, to provide more rapid service to a certain item provider or group of item providers, an ATSP may additionally or alternatively offer UAV transport service by UAVs deployed from pre-staging locations. Each pre-staging location may be co-located with a certain item provider, or located closer to a certain item provider or group of item providers than the nearest UAV nest.

In such arrangements, when an item provider requests a UAV for a transport task, the ATSP may dispatch a UAV pre-staging location that is near to or co-located at the item provider's location (or an item-source location designated by the item provider, which may help to reduce the delay due to the extra flight leg to pick up the item(s) from the item provider. And, in the scenario where a UAV is pre-staged at the item-source location, delay for the extra flight leg to the item provider may be eliminated entirely.

In some embodiments, UAVs may be pre-staged proactively, before specific requests for transport tasks are received, based on, e.g., predicted or estimated demand for UAV capacity at various pre-staging locations. In some cases, an ATSP may pre-emptively locate UAVs without payloads or with empty payload containers near item providers in anticipation of the item providers requesting the UAVs for transport tasks. Additionally or alternatively, an ATSP may pre-stage loaded UAVs near item recipients in anticipation of the item recipients ordering particular payload items.

Figure 4B:
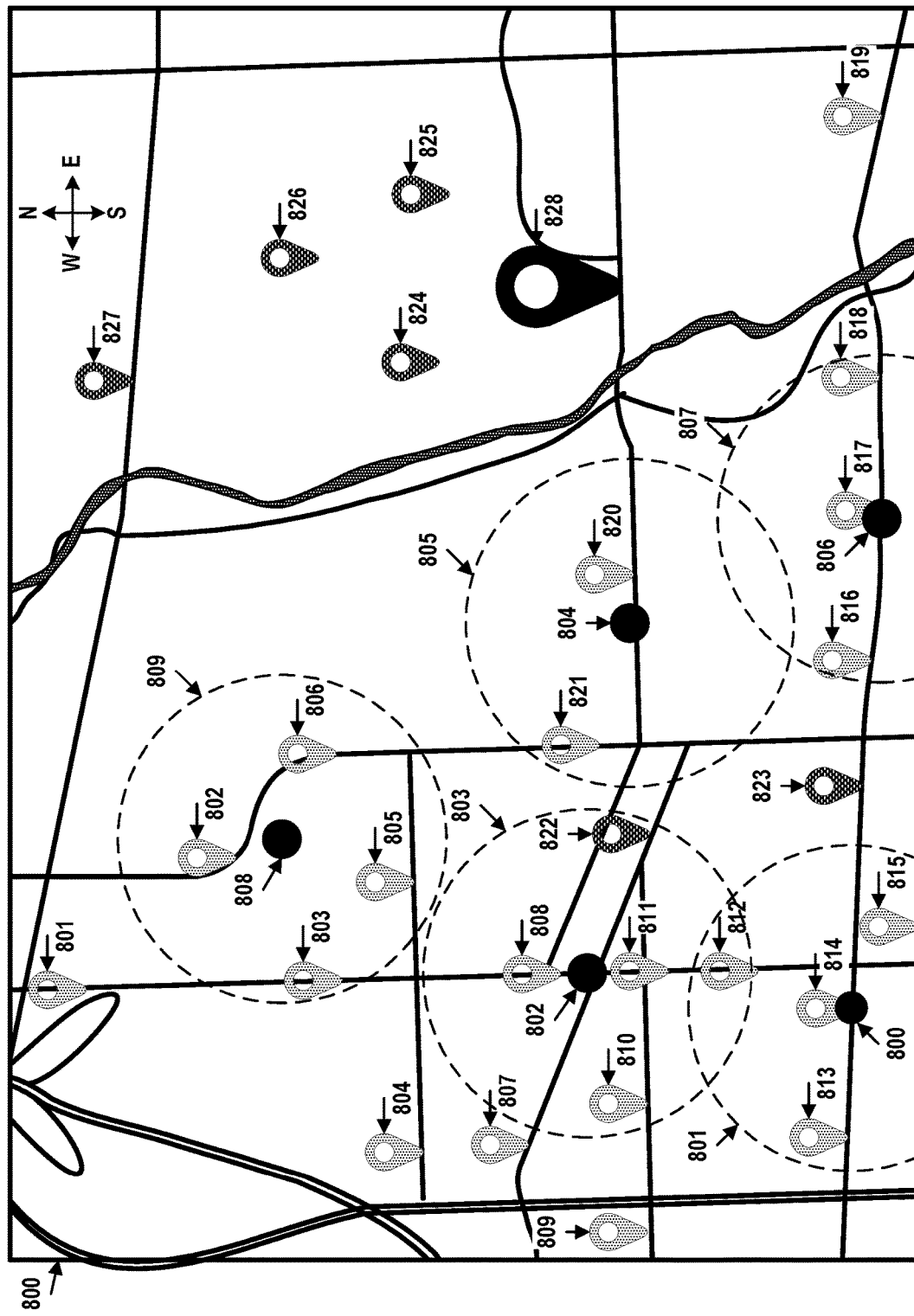
FIG. 4B illustrates a geographic distribution of an aerial transport provider system, in accordance with example embodiments.

FIG. 4B is a simplified illustrations showing an example distribution of UAVs among pre-staging locations 800, 802, 804, 806, and 808 within geographic area 800. These pre-staging locations may include any combination of environmental features (e.g., trees, lampposts, cell towers, etc.) and/or purpose-built landing structures (with or without battery chargers and/or other features). Pre-staging locations 800 and 806, for example, may be landing structures installed on buildings associated with item providers indicated by markers 814 and 817. Pre-staging locations 802, 804, and 808 may be landing structures or environmental features near item providers. Each of pre-staging locations 800, 802, 804, 806, and 808 may contain multiple UAVs. It is also possible that some pre-staging locations could be designed for a single UAV.

Additionally, each of pre-staging locations 800, 802, 804, 806, and 808 may be located so as to serve at least one item provider. For example, pre-staging location 800 may be located near to and operable to provide service (for at least some transport task) to item providers indicated by markers 812, 813, 814, and 815, pre-staging location 802 may be located near to and operable to provide service (for at least some transport task) to providers indicated by markers 808, 810, 811, and 812, as well as the item recipient indicated by marker 822, pre-staging location 804 is located near to and operable to provide service (for at least some transport task) to item providers indicated by markers 820 and 821, pre-staging location 806 is located near to and operable to provide service (for at least some transport tasks) to item providers indicated by markers 816, 817, and 818, and pre-staging location 808 is located near to and operable to provide service (for at least some transport tasks) to item providers indicated by markers 802, 803, 805, and 806. Additional pre-staging locations not shown in FIG. 8 may be included in geographic area 800 to accommodate, for example, item providers corresponding to markers 801, 804, 807, 807, and 819, as well as item recipients corresponding to markers 823, 824, 825, 826, and 827.

Having a certain close proximity between pre-staging locations and item providers may help an ATSP consistently respond to item provider requests, e.g., within a certain threshold amount of time. For example, an ATSP may distribute UAVs such that each of the item providers indicated by markers 812, 813, 814, and 815 may be reachable by UAVs pre-staged at pre-staging location 800 in under 30 seconds. Other examples are also possible.

In some embodiments, transport services performed by the pre-staged UAVs may be sold to the item providers at different rates than transport services performed by UAVs dispatched from the UAV nest. That is, item providers may be able to pay a premium for reducing a wait time for a UAV to arrive for payload pick-up. Additionally, in some instances, item providers that pre-order UAVs for transport tasks, and therefore allow the ATSP to more accurately schedule and configured its UAV fleet, may pay a lower rate for pre-staged UAVs that item providers that did not pre-order pre-staged UAVs.

Generally, pre-staging a UAV for an item provider may involve deploying, from the UAV nest or from another location and to the pre-staging location, an empty UAV that is not currently carrying a payload item and is thus capable of picking up a payload item from the item provider. On the other hand, pre-staging the UAV for an item recipient may involve deploying, to the pre-staging location, the UAV loaded with a payload item that the item recipient is predicted to order within a future time window. This may involve sending the UAV to an item provider to pick up the payload item predicted to be ordered before deploying the UAV to the pre-staging location. In one example, the ATSP may predict that the item recipient is predicted to order the payload item and, in response, purchase and pick up the payload item from an item provider. The ATSP may then pre-stage the UAV near the item recipient with the purchased payload item, and wait for the item recipient to order the item from the ATSP. Alternatively, the item provider may predict that the item recipient is predicted to order the payload item, and may order from the ATSP a UAV to be pre-staged with the item near the item recipient. In some instances, the ATSP and the item provider may coordinate in other ways to allow for pre-staging of payloads near item recipients in anticipation of the item recipients' orders.

VI. UAV DEPLOYMENT STATIONS

Figure 5A:
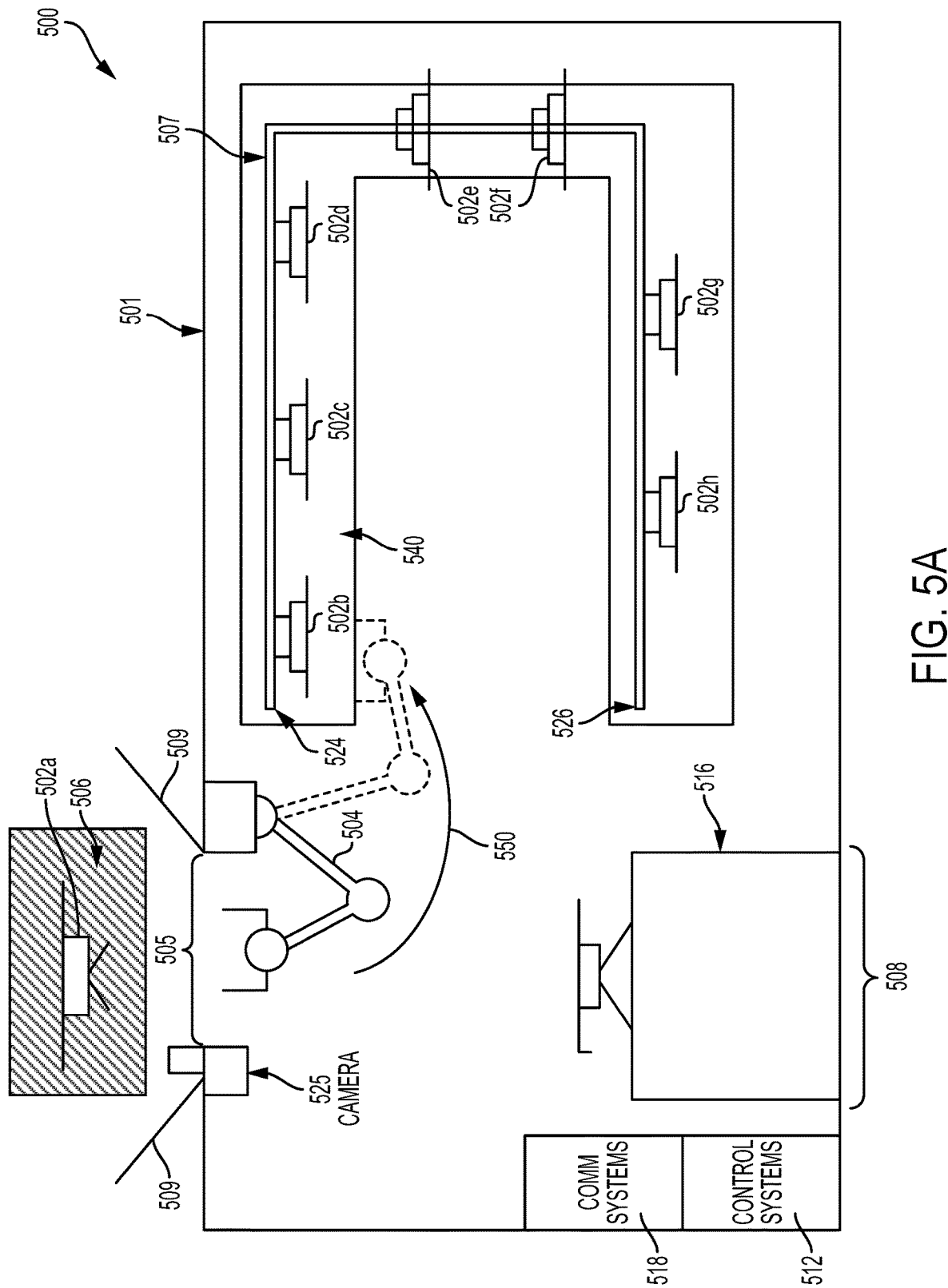
FIGS. 5A and 5B are simplified illustrations of a UAV deployment station, according to example embodiments.

FIG. 5A is a simplified side-view illustration a UAV deployment station 500, according to an example embodiment. An example UAV deployment station 500 may be implemented as a UAV nest, such as those described in reference to FIGS. 4A and 4B, and elsewhere herein. Additionally or alternatively, an example UAV deployment station 500 may be installed as infrastructure at a pre-staging location, such as those described in reference to FIGS. 4A and 4B, and elsewhere herein. Of course, UAV deployment station 500 may take other forms and be implemented in other infrastructure arrangements as well.

As shown, UAV deployment station 500 includes a container 501, which houses systems for receiving and servicing UAVs in between transport tasks. In other examples, container 501 may be part of a semi-trailer truck, train car, or other mobile or semi-mobile unit. More specifically, deployment station 500 includes a robotic device 504, an aperture 505 in an upper surface of container 501, a conveyor 507 for moving UAVs within the container 501, movable doors 509 for opening and closing aperture 505, a loading structure 516 for loading, inspecting, and/or servicing UAVs, a control system 512 operable to control the functioning of UAV deployment station 500 and/or to facilitate network communications by way of communication system(s) 518.

A. Containers

The container 501 may take various forms, and may be various shapes and/or sizes, within the scope of the invention. For instance, container 501 could a shipping container in a commonly available size (e.g., 8 feet wide, by 8.5 feet high, by twenty (20) feet or forty (40) feet long), or a shipping container in a another (e.g., custom) size. Other types of structures, made of various types of materials, are also possible. Further, container 501 could be designed as mobile infrastructure (e.g., as a self-contained shipping container movable by a flat-bed truck or other road vehicle), or could be installed as permanent infrastructure at a given location. When designed to be mobile, container 501 may be moved from location to location, such that an ATSP can more readily change the topology of their network of UAV nests. This could allow an ATSP to adapt to geographic shifts in demand for UAV transport service by, e.g., detecting and/or predicting localized changes in demand level in different geographic areas, and moving UAV nests (e.g., UAV deployment stations 500) to high-demand areas, as the high-demand areas change over time.

Note that while landing zone 506 and aperture 505 are shown on the upper surface of container 501. Other locations and/or arrangements of an aperture for receiving UAVs are also possible. For example, a container 501 could additionally or alternatively include an aperture for receiving and/or deploying UAVs on a side surface. In such arrangements, a robotic arm could be arranged to extend horizontally through the aperture to receive an incoming UAV. In a further aspect of such embodiments, a container could include a side door that pivots on its bottom edge and opens away from the container to create a horizontal landing surface for UAV (perhaps with fiducials to assist the UAV in landing). Additionally or alternatively, the robotic arm could place UAVs on a side-opening fold-out platform for take-off only (with a top-side aperture providing an entry point for UAVs). Other examples are of course possible.

In a further aspect of UAV deployment system 500, doors 509 can be opened and closed by, e.g., control system 512 or other automated means. In some examples, one or more sensors (not shown) may provide data to control system 512 to open or close doors 509. Manual doors are also possible. Further, implementations with a single door or more than two doors for entering and/or exiting UAVs are also possible. Additionally, while FIG. 5A shows hinged doors 509, other types of mechanisms for opening and/or closing a door to container 501 are possible, such as sliding door(s), for instance. Other features allowing for the opening and/or closing of an aperture to a container are possible. Yet further, in some embodiments, a UAV deployment station may not include any mechanism for closing the receiving and/or deployment aperture, such that the aperture for entering and/or exiting the station is always open.

In another aspect, when doors 509 are open and extend vertically above the upper surface of container 501, doors 509 may function as a shroud for a UAV 502a hovering in the airspace between the doors. As such, doors 509 may serve the additional purpose of shielding a UAV 502a located in the landing zone 506 from wind, which can help the UAV to move more predictably and/or in a more controlled manner while hovering in the landing zone 506. This in turn may improve the reliability of and/or simplify the process of the robotic arm 504 coupling to and securing a hovering UAV 502a.

B. Robotic Devices

Robotic device 504 may be any type of device or system having a moveable component or components, which is operable to secure or couple to a UAV, while the UAV is hovering in a landing zone above or adjacent to the UAV deployment station 500. For instance, in the illustrated implementation, robotic device 504 is a robotic arm and end effector having six degrees of freedom in its movement. Robotic arms having less than six degrees of freedom are also possible. For explanatory purposes, robotic device 504 may also be referred to herein as robotic arm 504. However, it should be understood that other types of robotic devices or mechanisms can be utilized to receive and couple to UAVs hovering above or next to a deployment station.

In order to secure an airborne UAV 502a, robotic arm 504 is movable so as to extend through aperture 505 and position end effector 522 in or below the landing zone 506, such that the end effector can be utilized to couple to UAV 502a. Once robotic arm 504 has secured an airborne UAV 502a, the robotic arm is operable to move UAV 502a through aperture 505 and inside of container 501. Further, the robotic arm 504 can move UAV 502a within the container 501 to a receiving location 524 on the conveyor 507, where the UAV 502a can be transferred from the robotic arm 504 to the conveyor 507.

In another aspect, robotic arm 504 can include an end effector 522 for securing or coupling to an airborne UAV 502a that is hovering in a landing zone 506 above container 501. Further, various types of end effectors could be utilized to receive and couple to a UAV is hovering or otherwise airborne in a landing zone 506 above or adjacent to container 501. For example, end effector 522 could be a magnetic end effector operable to magnetically couple to an airborne UAV 502a. As another example, end effector 522 could take the form of or include a vacuum-coupling end effector operable to create a vacuum that couples to and secures the UAV to the end effector (and perhaps can pulls an airborne UAV towards the end effector to assist in the coupling process). As yet another example, end effector 522 could be a "gripper" with opposing digits that can move towards one another to secure an airborne UAV 502a. Other types of end effectors for securing an airborne UAV are also possible.

C. Sensor Systems

In a further aspect, the UAV deployment station 500 may include one or more sensor systems that allow the station to detect when a UAV 502a is approaching (e.g., within a threshold distance from) the UAV deployment station 500. In the illustrated example, UAV deployment station 500 includes a camera 525 having a field of view that includes the landing zone 506. However, it should be understood that other types of sensor systems on UAV deployment station 500 and/or UAV 502a may also be utilized to detect when a UAV 502a is approaching and/or is within some threshold distance from UAV deployment station 500 or a particular feature or point on UAV deployment station 500 (e.g., a threshold distance from aperture 505).

Image data from camera 525 could be processed by control system 512 and/or other computing systems, in order to detect when UAV 502a is approaching the loading zone 506. When UAV 502a is detected in image data and/or other means, and while UAV 502a is still clear of the landing zone 506 (to allow room for doors 509 to open), control system 512 can open doors 509. Additionally, control system 512 could move the robotic arm to a "ready" position, where the end effector 522 is located near to and/or positioned to more easily and/or quickly couple to UAV 502a when it moves into landing zone 506. (Note that in the event that doors 509 are already open and/or robotic arm 504 is already in a ready position, the control system may simply leave the doors and/or robotic arm in their current state.)

In some embodiments, each UAV may be configured to detect when it is approaching or within a threshold distance from UAV deployment station 500 or a particular feature or point on UAV deployment station 500, and responsively signal to the UAV deployment station 500. Accordingly, the UAV deployment station 500 may receive a signal or message from UAV 502a when UAV 502a is approaching the landing zone 506, and responsively prepare the station to receive UAV 502a (e.g., by opening doors 509 and/or positioning robotic arm 504). Such a signal 500 may be received by way of a direct communication with the UAV 502a (e.g., a local wireless connection between the UAV 502a and control system 512) or an indirect communication (e.g., by way of a connection to a cellular data network or a remote server system that relays the communication).

To aid a UAV 502a in detecting a UAV deployment station 500, deployment station could include one or more fiducials, which are structural and/or visual features having a known size and/or arrangement on the deployment station.

Figure 5B:
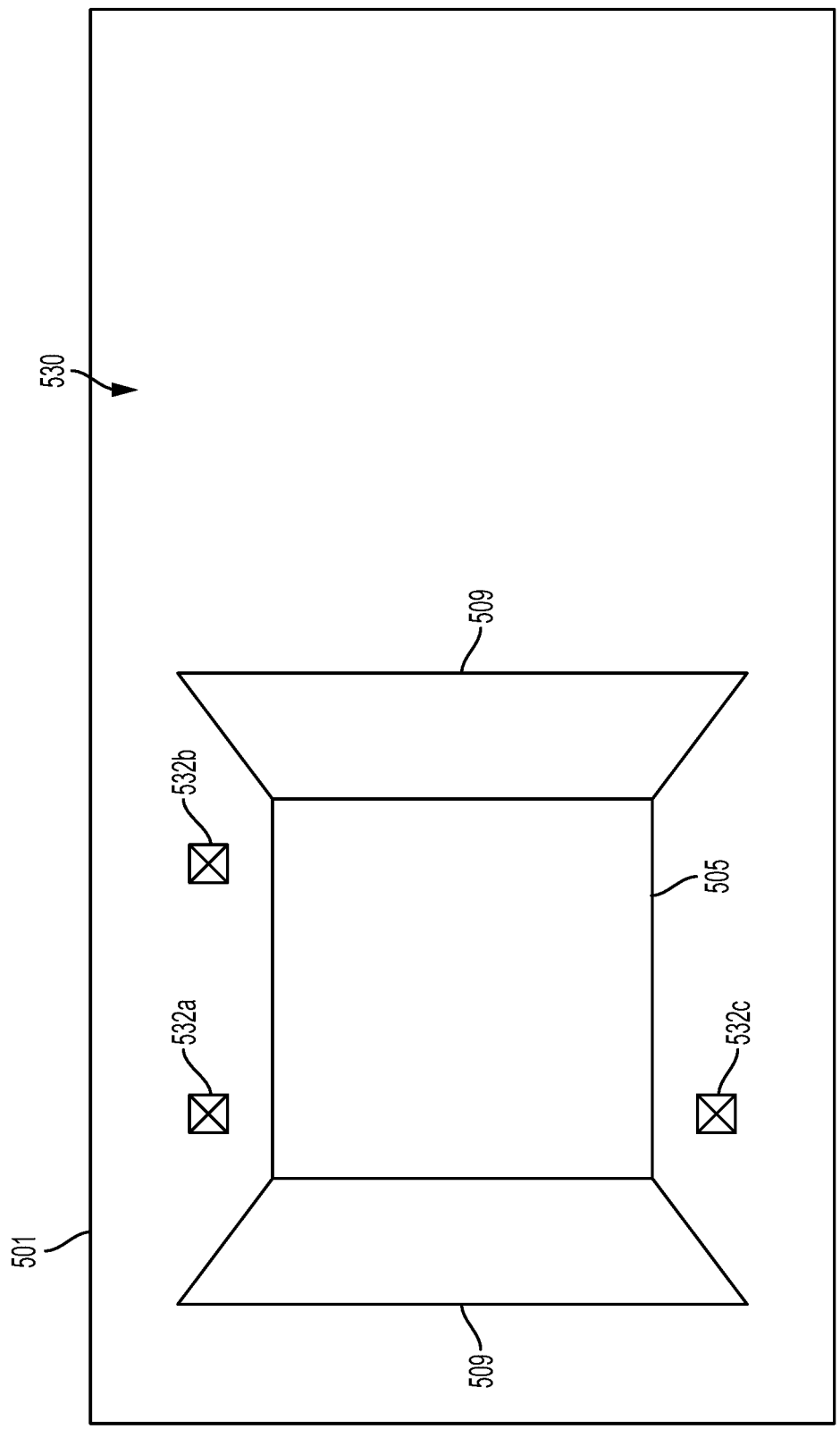

For example, FIG. 5B is a simplified illustration showing a top-down view of an upper surface 530 of container 501. As shown, the upper surface 530 of container 501 includes three fiducial markers 532a to 532c (also referred to simply as "fiducials"). These fiducials 532a to 532c can help a UAV 502a determine its position relative deployment station 500, such that UAV 502a can maneuver into and hover within the landing zone 506.

For instance, fiducials 532a to 532c can be arranged on an upper surface 530 in known arrangement; e.g., with a particular spacing, orientation, and location, on the deployment station 500. Accordingly, a UAV 502a may include a camera arranged to capture image data of the upper surface as the UAV 502a approaches deployment station 500. This image data may be processed by the UAV 502a, the UAV deployment station 500 (e.g., by control system 512), or another system communicatively coupled to both the UAV 502a and deployment station 500, to detect fiducials 532a to 532c in one or more frames of the image data. Then, a computer vision process may be implemented to compare the apparent arrangement of the fiducials 532a to 532c in image data captured from the UAV 502a to the actual known arrangement of fiducials 532a to 532c, and derive the position and/or orientation of UAV 502a relative to UAV deployment station 500 (and perhaps more specifically, relative to the landing zone 506 and/or aperture 505). The UAV 502a can then use its determined position and/or orientation to move into and/or hover in landing zone 506 above UAV deployment station 500.

In some implementations, each UAV could additionally or alternatively include fiducial markers (not shown) that are located and arranged on the UAV. In such implementations, UAV deployment station 500 can detect the fiducials on an approaching UAV (e.g., using camera 626 or another camera facing upward). The UAV deployment station 500 can then use the detected fiducials to determine the position and/or orientation of UAV 502a relative to UAV deployment station 500, communicate such relative positioning information to UAV 502a, and/or send flight control instructions to UAV 502a based on this information (to assist UAV 502a in moving into and/or hovering in landing zone 506). Further, in some embodiments, both UAV 502a and deployment station 500 may include fiducial markers, thereby providing redundancy and/or helping to more accurately determine the position and/or orientation of the UAV 502a relative to deployment station 500.

In a variation on the illustrated example, fiducial markers could additionally or alternatively be placed on doors 509a, such that the face upward when the doors are open. In such embodiments, the fiducials would be hidden when the doors are closed, and could thus also serve as an indication to a UAV that the doors are open, when visible (and as an indication the doors are closed, when not visible).

Other types of visual and non-visual signals and/or systems could also be used to facilitate the movement of UAV 502a into a hovering position above aperture 505. For example, when UAV 502a is approaching landing zone 506, audible signals could be played out from a source on deployment station 500, such that changes in perceived intensity (e.g., measured in dB) measured at the UAV can be used to help determine whether the UAV is moving closer to or further from deployment station 500. Other examples are also possible.

D. Conveyer Systems

The conveyer 507 is operable to move UAVs 502a to 502h from a receiving location (or possibly from multiple receiving locations) along a track to removal location 526 (or possibly to one of a number of possible removal locations). And, when a given UAV 502a to 502h arrives at a removal location 526, the UAV can be transferred to a loading station 516 located in a loading zone 508.

Further, a conveyer 507 may take various forms. Generally, the conveyer 507 may be any system, device, or apparatus that is operable to move one or more UAVs from a receiving location, where an incoming UAV is transferred from robotic device 504 to the conveyor 504, to a removal location, where the UAV can be removed for re-deployment and/or removed for other purposes. In the illustrated example, conveyer 507 takes the form of a "C-shaped" track, which can receive each UAV 502a to 502h at receiving location 524, then move each UAV along an upper horizontal portion of the conveyer track, down a vertical portion of the conveyer track, and then along a lower horizontal portion of the conveyer track (running in the opposite direction of the upper horizontal portion), to a removal location 526.

The C-shaped track shown in FIG. 5 may provide various benefits. For instance, in the illustrated example, the C-shaped track allows a single robotic arm 504 to reach the receiving location 524 and the removal location 526. As such, the same robotic arm 504 can both (a) move UAVs from loading zone 506 to the conveyer 507 at receiving location 524, and (b) move UAVs from the removal location 526 to the loading zone 516 (or to a location from which the UAV can take off and exit the container 501). This single-arm configuration may be beneficial since robotic arms are costly, and/or because UAV arrivals and departures at station 500 may occur infrequently enough that scheduling arrivals and departures to allow a single robotic arm to be used for both does not affect the overall efficiency of the system (e.g., does not reduce the number of arrivals and/or departures beyond the number that is possible due to other factors, such as battery recharging time). Of course, arrangements with multiple robotic arms and/or other types of robotic devices are also possible.

Further, conveyor systems of other shapes and/or sizes of are possible. For example, a closed-loop conveyer could be utilized, such that UAVs could make multiple laps on the conveyer. Other examples are also possible. Additionally, while conveyor 507 is configured to hang UAVs therefrom, conveyer systems that do not suspend UAVs from above are also possible. For instance, some implementations could incorporate a conveyer system that supports UAVs thereon from below, such as a conveyer belt configured to move UAVs resting thereon, among other possibilities.

Figure 5C:
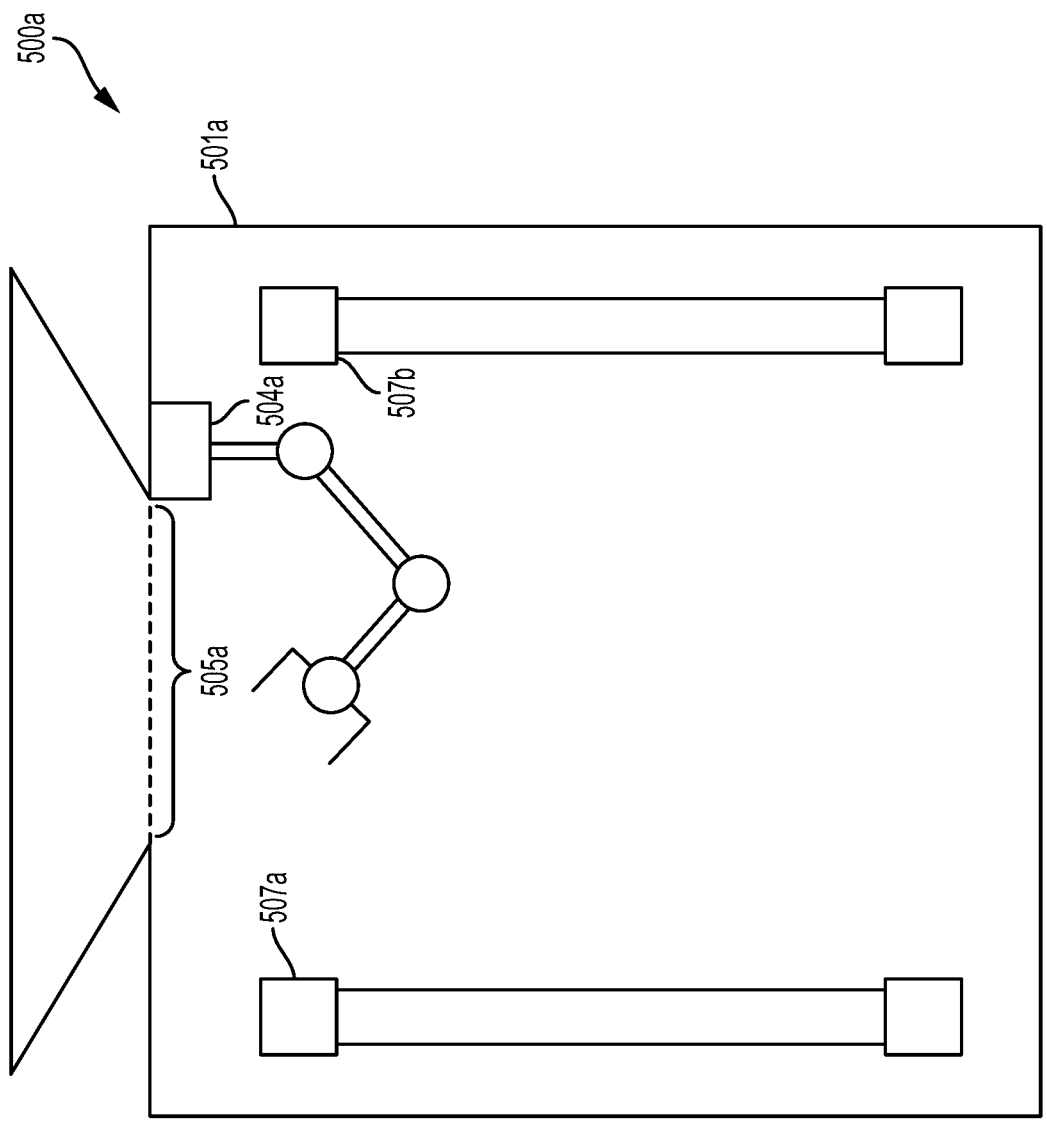
FIG. 5C is a simplified illustration of another UAV deployment station, according to example embodiments.

Additionally, while FIG. 5A shows a single conveyor 507, implementations with multiple conveyors are also possible. For example, FIG. 5C is a simplified front-view illustration of another UAV deployment station 500a, according to example embodiments. UAV deployment station 500a functions in a similar manner to UAV deployment station 500, except that UAV deployment station 500a includes two conveyers 507a and 507b, located on either side of container 501a. Further, UAV deployment station 500a includes a robotic arm 504a, that is operable to couple to hovering UAVs above aperture 505a, and move a given UAV to either of conveyer 507a and 507. In other words, robotic arm 504a services both conveyers 507a and 507b. In other arrangements, a separate robotic arm could service each conveyer of a multi-conveyer deployment station. Further, implementations with more than two conveyers are also possible.

E. Battery Charging Systems

In a further aspect, the UAV deployment station 500 includes a battery charging system 540. The battery charging system 540 is operable to concurrently charge two or more aerial vehicles 502*a* to 502*h*. In the illustrated arrangement, battery charging system 540 is a wireless charging system (e.g., providing inductive charging), includes one or more wireless power transmitters installed adjacent to the convey 507 (e.g., on a side wall of the container 501), such that the wireless power transmitters can charge UAVs 502*b* to 502*h* as they move along conveyor 507, from receiving location 524 to the removal location 526. Such a wireless charging system could be arranged to charge UAVs along the entire length of conveyor 507, or only on a portion or certain portions of the conveyor 507.

Other arrangements for wireless charging transmitters, relative to the conveyor 507, are also possible. For instance, one or more wireless power transmitters could be arranged within a fixed track installed along a conveyor system. In such arrangements, the transmitters installed on the track could wirelessly charge UAVs that are hanging below the track, as the UAVs move along the track. Alternatively, transmitters installed on the track could wirelessly charge UAVs that are resting on a moving conveyor belt, as they move along the conveyer. Other arrangements for wireless power transmitters are also possible.

Further, battery charging system 540 may be implemented using various types of wireless charging protocols. For example, inductive charging may be accomplished using a series of transmitters positioned along or within a UAV conveyer, such as conveyer 507. Each UAV may include a corresponding wireless power receiver that inductively couples to the transmitters by way of an oscillating magnetic field. In such implementations, the wireless power receiver is positioned on the UAV such that when the UAV is coupled to the conveyer and moving past a given transmitter, the receiver is within range of the transmitter. Further, as the UAV moves along the conveyor 507, charging may be handed off from one transmitter to another.

In some implementations, the transmitter(s) of battery charging system 540 include a transmit-coil that creates an oscillating magnetic field when driven by a power source. This oscillating magnetic field passes through a receive-coil in the UAV's receiver and induces AC current. A converter on the UAV (or coupled to the UAV) can then convert the induced AC current to a DC current that is applied to charge the UAV's battery (or batteries).

In such implementations, the magnitude of coupling between the transmitter and the receiver can be represented by a coupling factor k, a dimensionless parameter representing the fraction of flux coupling the transmitter and the receiver. In order to establish efficient power transfer in such conventional systems, the coupling factor k should be maintained at a sufficiently high level. Accordingly, the receiver coil on the UAV is preferably positioned such that a surface of the UAV having the receiver coil faces each wireless transmitter in the container as it passes by. For instance, if UAVs 502*a* to 502*h* are suspended below the conveyer 507 such that the underside of each UAV faces an adjacent sidewall having the transmitters of battery charging system 540 installed thereon. Other arrangements are of course possible.

In some implementations, battery charging system 540 may utilize resonant coupling to transfer power more efficiently from a transmitter to a receiver. Such systems and methods may have less stringent proximity and/or positional requirements as compared to more conventional inductively-coupled wireless power systems. In other words, a deployment station 500 and UAVs including wireless-power transmitters and receivers using resonant coupling, can provide more efficient wireless power transfer with a smaller coupling factor k.

Specifically, in accordance with some embodiments, battery charging system 540 may include transmitters that can resonantly couple to receivers that are on or coupled to UAVs on conveyor 507, such that wireless power transfer can occur between each resonantly-coupled transmitter and one or more UAV receivers by way of an oscillating field generated by the transmitter. The oscillating field may include an oscillating magnetic field component and/or an oscillating electric field component. In such implementations, a transmit-resonator and/or a receive-resonator can be characterized by one or more resonant frequencies, among other factors. As such, a transmit-resonator of battery charging system 540 and corresponding UAV receive-resonators may be configured to resonate at a common resonant frequency. When resonating, the receive-resonator may produce an output signal oscillating at the resonant frequency. The output signal may then be rectified or otherwise converted to electrical power, which can then be converted to a DC output to charge the UAV batteries.

Additionally or alternatively, a UAV deployment station 500 could include a wired charging system. For instance, slip ring system could be implemented to transmit AC power from a stationary component or components of conveyor 507, such as a frame that couples the conveyor 507 to the container 501 and holds conveyor 507 in place, to components of the conveyor that move UAVs from the receiving location 524 to the removal location 526, such as a hanger or coupling plate, among other possibilities. The component coupling each UAV to the conveyor 507 could then serve as an AC power source for the UAV, such that a DC converter on the UAV could provide DC to charge the UAV's battery. Alternatively, the component coupling each UAV to the conveyor 507 could also include an AC-DC converter, such that the UAV itself does not need to include a DC converter. Embodiments without a DC converter may be desirable, since the lack of a converter can reduce the weight of the UAV, and potentially increase the maximum flight time per full charge.

In a further aspect, the UAV deployment station 500 includes a loading structure 516, which is located in a loading area 508. The loading area 508 may be a designated space inside the container 501 where items can be loaded onto the UAVs (e.g., placed in tethered containers or packages, attached directly to a UAV's tether, or placed in a compartment inside of the UAV's body). The loading structure 516 could be a table or other surface for manually loading a payload on a UAV, pre-staging a UAV, and/or servicing a UAV, among other possibilities. Alternatively, the deployment station 500 could include systems for automating some or all of the aforementioned functions. Further, in some cases, the loading zone 508 may not include any loading structure (e.g., the loading zone could also simply be a designated ground space in the container from UAVs could take off). Other implementations for a loading zone are possible as well. Further, UAV deployment stations without any loading zone or loading structure are possible.

To facilitate take off, the loading zone 508 may be located below the aperture 505, such that a single opening can be used to bring UAV into the container 501, and to allow UAVs to depart the container 501. Of course, it is also possible that a UAV deployment station could include separate apertures designed for UAV arrival and departure. It is also possible for a UAV deployment station to include multiple apertures designated for both UAV arrivals and departures.

F. Control and Communication Systems

As noted above, UAV deployment station 500 includes a control system 512. The control system 512 includes one or more processors, which could be general-purpose processor(s) and/or special purpose processor(s) (e.g., digital signal processors, application specific integrated circuits, etc.). The control system also includes or has access to data storage having computer-readable program instructions stored thereon. These program instructions are executable by the one or more processors to provide control functionality of UAV deployment station described herein, including, but not limited to, controlling and/or coordinating the operation of robotic device 504, conveyor 507, camera 525 and/or other sensors, doors 509, communication system(s) 518, and/or battery charging station 540, among other possibilities. Accordingly, container 504 may contain wiring (e.g., data bus(es)) to facilitate communication between control system 512 and other components of UAV deployment station 500. Additionally, or alternatively, control system 512 may include or have access to interfaces for communicating wirelessly with other components of UAV deployment station 500.

As further noted above, UAV deployment station 500 includes one or more communication systems 518 for communicating with UAVs, ATSP server systems, and/or other entities. The one or more communication systems 518 may include wired and/or wireless communication interfaces. For instance, communication system(s) 518 may include one or more wireless interfaces for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Additionally or alternatively, communication system(s) 518 may include one or more wireline interfaces, such as an Ethernet interface, a Universal Serial Bus (USB) interface, a coaxial cable, an optical link, and/or a fiber-optic link, among other possibilities. Further, communication system(s) 518 may provide for direct communication with other entities (e.g., by way of a Bluetooth or wireless LAN connection with a UAV) and/or indirect communication by way of a communication network (e.g., by way of the Internet, a cellular network, or an ATSP's private backbone network).

In a further aspect, container 501 may include features that allow for manual and/or automated inspection of UAVs while located inside of the container. For example, the robotic arm may position a UAV on the conveyor, on a loading table, or at another location in the container. In some embodiments, the container may include a camera or cameras along the sides of the conveyor(s), facing a loading table, or elsewhere in the container, which are arranged to capture image data of UAVs that is usable for automated inspection processes (e.g., by analyzing images of a UAV for abnormalities, signs of wear, and/or other visual indications of the state of the UAV). Additionally or alternatively, the container could include wired and/or wireless interfaces for coupling the UAV to diagnostic systems. In such embodiments, the robotic arm could move a UAV so as to couple with such interfaces while the UAV is on the conveyor, on a loading table, and/or at another location in the container.

G Process Pieces

In a further aspect, a UAV deployment station 500 may utilize a process piece to simplify the coupling of the robotic arm 504 to a hovering UAV 502a, the transfer of a UAV to the conveyer 507, the coupling of a UAV to the conveyer 507, and/or the coupling of a UAV's electrical system to battery charging system. More generally, a process piece may be a single structure that can be attached to a UAV when it arrives at UAV deployment station 500, and removed from the UAV before it departs from station 500. The process piece may thus be a single component that is couplable to a UAV, and includes features and/or systems that allow a UAV coupled thereto to interface with multiple mechanical components and/or electrical systems of UAV deployment station 500. Providing such features and/or systems for the UAV in a removable process piece may eliminate the need for integration of such features in a UAV itself, which in turn can reduce UAV weight and increase its maximum flight time on a full charge. Further, utilization of such a process piece for interfacing with mechanical components and/or electrical systems of a UAV deployment center may allow for easier upgrades to such components and systems. In other words, when mechanical components and/or electrical systems of a UAV deployment station are upgraded or changed, or when new components or systems are added, it may be possible to upgrade the process pieces only, without requiring that the UAVs undergo any structural changes and/or system upgrades.

Figure 6:
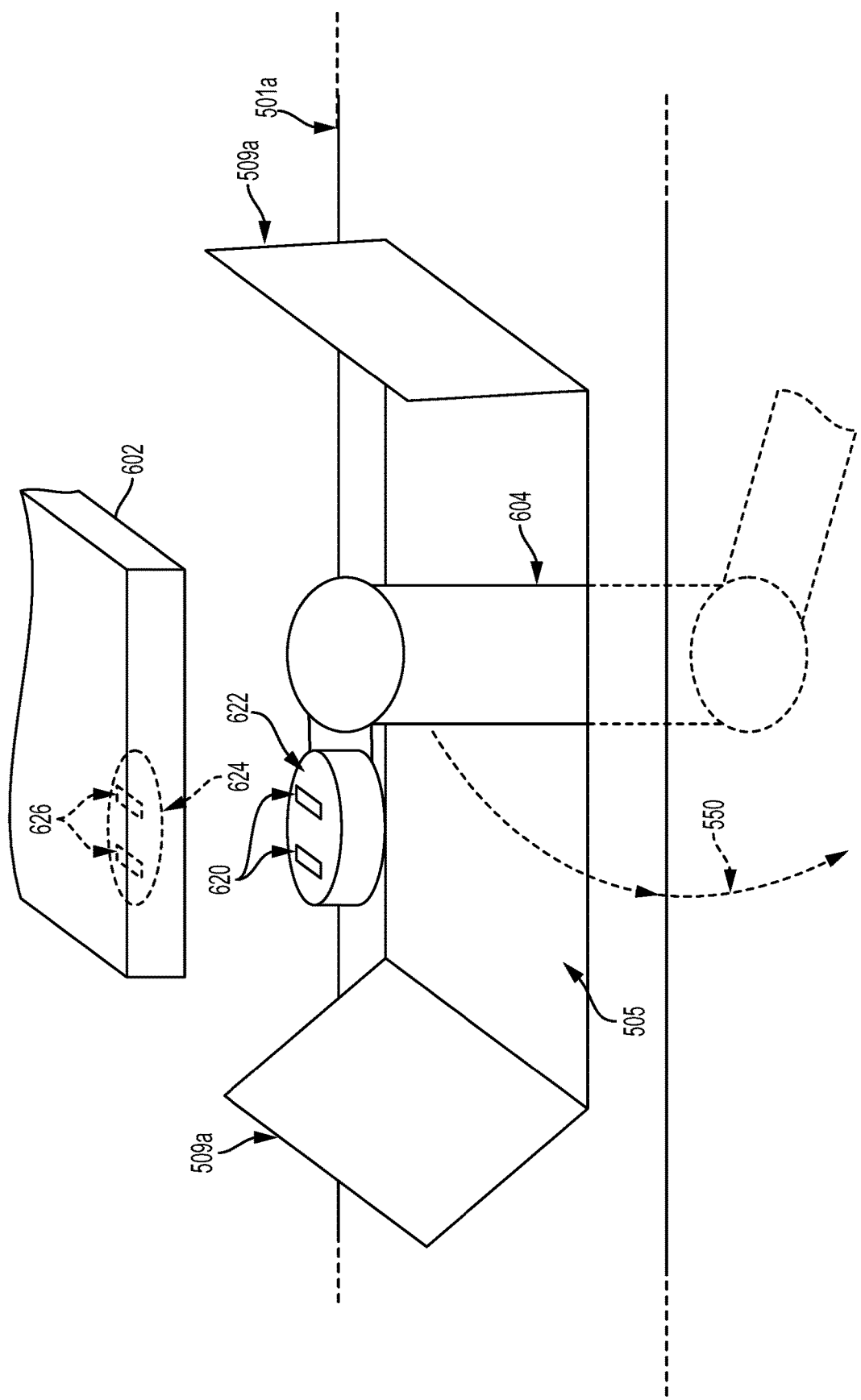
FIG. 6 is a simplified illustration of a portion of a UAV deployment station utilizing a process piece, according to example embodiments.

FIG. 6 is a simplified illustration of a process piece, according to example embodiments. In particular, FIG. 6 shows a disc-shaped process plate 622 coupled to a robotic arm 604. (The robotic arm 604 may function and be arranged in a UAV deployment station in the same or similar manner as described above in reference to robotic arm 504.) FIG. 6 also shows a lower portion of a UAV 602, which includes a mating feature 624 that is designed to couple to process plate 622.

The process plate 622 may include magnetic features (not shown), which produce a magnetic field extending above the process plate. Correspondingly, the mating feature 624 on UAV 602 may include features formed from ferromagnetic material, and/or may be wholly or substantially made of a ferromagnetic material, such that process plate 622 can magnetically couple to a hovering UAV 602. Further, in some embodiments, process plate 622 could include switchable and/or variable electromagnetic features. In such embodiments, the robotic arm could turn off or lower the power of its electromagnet(s) until the process plate 622 moves into contact with or close to (e.g., within a threshold distance from) the mating feature 624 of UAV 602. Once in contact with or close enough to the mating feature 624, the deployment station control system (or another control system for the robotic arm) can turn on or increase the power of the process plate's electromagnet(s) in order to secure the UAV 602, such that the robotic arm 604 can carry UAV 602 through aperture 505 and into container 501.

A process plate 622 also could use other non-magnetic systems and/or features to couple to a hovering UAV. For example, a process plate could include a vacuum coupling system, that creates a vacuum between a surface of the process plate (or a feature attached to the process plate) to secure the UAV. As another example, a process plate could include various types of mechanical coupling features designed to lock a UAV to the process plate. Other types of features and/or systems for coupling to a UAV are also possible.

In a further aspect, once robotic arm 604 and moves the UAV 602 inside the deployment station and to the conveyer 507 (e.g., by moving on a path such as path 550 shown in FIG. 5A), the robotic arm 604 may transfer both the process plate 602 and the UAV 602 to a conveyor 507. For instance, once the process plate 622 is coupled to mating feature 624 such that UAV 602 is secured, the robotic arm 604 can move the secured UAV 602 along a path 550, until the UAV is positioned upside-down. When positioned upside-down at or near receiving location 524, the underside of UAV 602 and the process plate 622 will face upwards, towards the underside of conveyor 507. As such, the side 628 of the process plate that is opposite of the side coupled to the UAV 602, will be exposed to and facing the conveyor 507. The robotic arm 604 can then move the UAV 602 and process plate 622 to the conveyor, where the opposite side 628 of the process plate 622 can couple to the conveyor 507. The robotic arm 504 can then release the process plate 622 and UAV 602, such that the UAV 602 is suspended from the conveyor 507 by way of the process plate 622.

Note that various coupling mechanisms and/or features may be utilized to couple the opposing side 628 of process plate 622 to the conveyor 507. For instance, process plate 622 may couple to the conveyer by way of magnetic features, electromagnets, vacuum coupling features, and/or mechanical coupling or locking features, among other possibilities. Further, note that the above described arrangement of magnetic features on the process plate 622 and ferromagnetic material on the mating feature may be reversed, such the process plate includes or is formed in whole or in part from ferromagnetic material, and the magnets or electromagnets are implementing on a mating surface of the UAV. Likewise, the opposite side 628 of process plate 622 may include or be formed in whole or in part from ferromagnetic material, while magnets or electromagnets are disposed at various connection points on conveyor 507. Further, it is possible that magnets with opposite and attracting poles could be arranged on process plate 622 and mating feature 624, and/or on the opposite side 628 of process plate 622 and a corresponding surface of conveyor 507.

In a further aspect, process plate 622 includes electrical interfaces 620 that are arranged to electrically couple to corresponding electrical interfaces 626 on the mating feature 624 of UAV 602. The coupling of such electrical features could facilitate various features.

For instance, electrical interfaces 620 and electrical interfaces 626 could simply be electrical contacts, allowing for AC or DC power transfer to UAV 602 by way of process plate 622. For example, process plate 622 could include a receiver for wireless charging. Further, process plate 622 could include a DC converter for converting AC output of the receiver to DC output to charge the UAV's battery. Additionally or alternatively, electrical interfaces 620 and electrical interfaces 626 could include interfaces that allow for data communication between the UAV 602 and a control system of the UAV deployment station. Further, it should be understood that process plate 622 may include other types of interfaces in addition or in the alternative to those described herein.

In a further aspect, the circular shape of process plate 622 may provide certain benefits. For example, the circular shape may simplify a process of aligning of the process plate 622 with the mating feature 624 of UAV 602. Additionally or alternatively, the circular shape of process plate 622 may allow for rotation of a UAV attached thereto, while the UAV is suspended from conveyor 507. The ability to rotate the UAV while it is coupled to the conveyor may be useful to, e.g., performance maintenance on the UAV, among other possibilities.

III. CONCLUSION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system comprising:
a container configured to house a plurality of aerial vehicles;
a conveyor operable to couple to the aerial vehicles and move the aerial vehicles from a receiving location to a removal location;
a robotic device having a moveable component operable to couple to a first aerial vehicle hovering outside the container, to move the first aerial vehicle into the container, and to transfer the first aerial vehicle to the conveyor at the receiving location;
a control system operable to control at least the robotic device; and
a battery charging system arranged adjacent to the conveyor such that the battery charging system is operable to concurrently charge two or more aerial vehicles coupled to the conveyor, while the two or more aerial vehicles are coupled to and moving along the conveyor.

2. The system of claim 1, wherein the robotic device comprises a robotic arm.

3. The system of claim 2, wherein the robotic arm is operable with six degrees of freedom.

4. The system of claim 2, further comprising an end effector coupled to the robotic arm, wherein the robotic arm is operable to use the end effector to secure the first aerial vehicle while the first aerial vehicle is hovering in a landing zone above or adjacent to an aperture in the container.

5. The system of claim 4, wherein the end effector comprises a gripper, a magnetic coupling feature, or a vacuum coupling feature for coupling to aerial vehicles.

6. The system of claim 1, further comprising a plurality of process plates, wherein each process plate is configured to concurrently couple to an aerial vehicle and the conveyor, such that the aerial vehicle is couplable to the conveyor by way of the process plate.

7. The system of claim 6, wherein the control system is operable to:
operate the robotic device to couple to a first process plate, and to secure the first aerial vehicle, when the first aerial vehicle is hovering above a landing zone, by coupling of the first aerial vehicle to the first process plate;
subsequently operate the robotic device to move the first process plate, with the first aerial vehicle coupled thereto, to the conveyor, such that the first aerial vehicle is coupled to the conveyer by the first process plate.

8. The system of claim 1, wherein the robotic arm is configured to couple to a first process plate and use the first process plate to secure the first aerial vehicle while the first aerial vehicle is hovering outside the container.

9. The system of claim 8, wherein the robotic arm is further configured, after securing the first aerial vehicle, to move the first aerial vehicle inside the container and transfer both the first aerial vehicle and the first process plate to the conveyer.

10. The system of claim 8, wherein each process plate is configured, when coupling a given aerial vehicle to the conveyor, to also couple the given aerial vehicle to the battery charging system, such that a battery of the given aerial vehicle is charged as it moves along the conveyor.

11. The system of claim 1, wherein the conveyor comprises a plurality of moveable coupling features that are each configured to couple an aerial vehicle to the conveyor, and wherein each coupling feature is arranged to connect an aerial vehicle coupled thereto, to the battery charging system.

12. The system of claim 11, wherein the conveyor comprises a track, and wherein the plurality of coupling features comprise a plurality of hangers that are each operable to suspend an aerial vehicle below the track.

13. The system of claim 1, wherein the battery charging system comprises a wireless charging system.

14. The system of claim 13, wherein the wireless charging system comprises one or more transmitters operable for resonant coupling to receivers that are disposed in each aerial vehicle or a component that is electrically coupled to the aerial vehicle when the aerial is coupled to the conveyor.

15. A system comprising:
a container configured to house a plurality of aerial vehicles;
a conveyor operable to couple to aerial vehicles and to move the aerial vehicles from a receiving location to a removal location;
a robotic device having a moveable component operable to couple to a first aerial vehicle hovering outside the container, to move the secured first aerial vehicle into the container, and to transfer the first aerial vehicle to the conveyor at the receiving location;
a control system operable to control at least the robotic device;
a plurality of process plates, wherein each process plate is configured to couple to an aerial vehicle to the conveyor, such that two or more aerial vehicle are concurrently couplable to the conveyor; and
a battery charging system arranged adjacent to the conveyor such that the battery charging system is operable to concurrently charge two or more aerial vehicles coupled to the conveyor, while the two or more aerial vehicles are coupled to and moving along the conveyor.

16. The system of claim 15, wherein the control system is further operable to:
operate the robotic device to couple to a first process plate, and to secure the first aerial vehicle use the process plate to secure the first aerial vehicle while it is hovering outside the container; and
subsequently operate the robotic device to move the first aerial vehicle inside the container and transfer both the first aerial vehicle and the first process plate to the conveyer.

17. The system of claim 15, wherein each process plate is configured, when coupling a given aerial vehicle to the conveyor, to also couple the given aerial vehicle to the battery charging system.

18. The system of claim 17, wherein the battery charging system comprises a plurality of wireless power transmitters, and wherein each process plate comprises a wireless power receiver and at least one electrical coupling feature for electrically coupling to an electrical system of an aerial vehicle coupled thereto.

19. The system of claim 18, wherein each process plate further comprises a converter for converting alternating current output from the wireless power receiver to direct current for charging a battery of an aerial vehicle coupled to the process plate.

20. The system of claim 1, wherein the battery charging system comprises a plurality of transmitters, and wherein concurrently charging two or more aerial vehicles coupled to the conveyer comprises charging the two or more UAVs by different transmitters of the plurality of transmitters as the two or UAVs move along the conveyor.

* * * * *